United States Patent
Nonaka et al.

(10) Patent No.: US 7,617,536 B2
(45) Date of Patent: Nov. 10, 2009

(54) UNAUTHORIZED DEVICE DETECTION DEVICE, UNAUTHORIZED DEVICE DETECTION SYSTEM, UNAUTHORIZED DEVICE DETECTION METHOD, PROGRAM, RECORDING MEDIUM, AND DEVICE INFORMATION UPDATE METHOD

(75) Inventors: Masao Nonaka, Osaka (JP); Toshihisa Nakano, Osaka (JP); Yuichi Futa, Osaka (JP); Motoji Ohmori, Osaka (JP); Takeshi Gomi, Tokyo (JP); Kazukuni Kobara, Tokyo (JP); Hideki Imai, Kanagawa (JP)

(73) Assignees: Panasonic Corporation, Osaka (JP); The University of Tokyo, Tokyo (JP)

( * ) Notice: Subject to any disclaimer, the term of this patent is extended or adjusted under 35 U.S.C. 154(b) by 209 days.

(21) Appl. No.: 10/589,288

(22) PCT Filed: Dec. 12, 2005

(86) PCT No.: PCT/JP2005/022788

§ 371 (c)(1),
(2), (4) Date: Mar. 28, 2007

(87) PCT Pub. No.: WO2006/064768

PCT Pub. Date: Jun. 22, 2006

(65) Prior Publication Data
US 2007/0283162 A1    Dec. 6, 2007

(30) Foreign Application Priority Data
Dec. 13, 2004  (JP)  .............................. 2004-360436
Dec. 13, 2004  (JP)  .............................. 2004-360437

(51) Int. Cl.
*G06F 17/30* (2006.01)
(52) U.S. Cl. ......................................... 726/26; 705/55

(58) Field of Classification Search .................... 705/55
See application file for complete search history.

(56) References Cited

U.S. PATENT DOCUMENTS 5,949,877 A * 9/1999 Traw et al. ................... 713/171
6,118,873 A    9/2000 Lotspiech et al.

(Continued)

FOREIGN PATENT DOCUMENTS

EP   1 098 311   2/2003

(Continued)

*Primary Examiner*—William R Korzuch
*Assistant Examiner*—Brett Squires
(74) *Attorney, Agent, or Firm*—Wenderoth, Lind & Ponack, L.L.P.

(57) ABSTRACT

An unauthorized apparatus detection device detecting clones of a playback device. In a management server, a reception processing unit acquires a user terminal identifier and a first random number of a user terminal, judges whether a second management server random number, which is stored in a storage unit in correspondence with the user terminal identifier, matches the first user terminal random number. If the two fail to match, a display unit displays a message indicating that a clone exists. If the two match, a terminal information generation unit generates a new random number, and writes the generated random number as the second random number in the storage unit. A transmission processing unit transmits the generated random number to the user terminal via a transmission/reception unit and the user terminal updates the first user terminal random number to the generated random number.

11 Claims, 12 Drawing Sheets

U.S. PATENT DOCUMENTS

| | | | |
|---|---|---|---|
| 6,466,777 B1 | 10/2002 | Urita | |
| 6,581,160 B1 | 6/2003 | Harada et al. | |
| 6,609,116 B1 | 8/2003 | Lotspiech | |
| 6,650,753 B1 | 11/2003 | Lotspiech et al. | |
| 6,832,319 B1 | 12/2004 | Bell et al. | |
| 6,850,914 B1 | 2/2005 | Harada et al. | |
| 6,883,097 B1 | 4/2005 | Lotspiech et al. | |
| 6,888,944 B2 | 5/2005 | Lotspiech et al. | |
| 6,947,563 B2 | 9/2005 | Fagin et al. | |
| 7,007,162 B1 | 2/2006 | Lotspiech | |
| RE39,166 E * | 7/2006 | Gammie | 380/228 |
| 2001/0029583 A1 * | 10/2001 | Palatov et al. | 713/193 |
| 2002/0013900 A1 * | 1/2002 | Ibuki | 713/168 |
| 2002/0106087 A1 | 8/2002 | Lotspiech et al. | |
| 2002/0114471 A1 | 8/2002 | Fagin et al. | |
| 2004/0049464 A1 | 3/2004 | Ohmori et al. | |
| 2004/0156503 A1 | 8/2004 | Bell et al. | |
| 2004/0213112 A1 * | 10/2004 | Kim et al. | 369/53.21 |
| 2004/0260923 A1 | 12/2004 | Nakai et al. | |

FOREIGN PATENT DOCUMENTS

| | | |
|---|---|---|
| JP | 03-195309 | 8/1991 |
| JP | 2000-031922 | 1/2000 |
| JP | 2000-184447 | 6/2000 |
| JP | 2000-222534 | 8/2000 |
| JP | 2001-166996 | 6/2001 |
| WO | 03/034651 | 4/2003 |
| WO | 2004/023524 | 3/2004 |

* cited by examiner

FIG. 3A

| USER TERMINAL IDENTIFIER | FIRST USER TERMINAL RANDOM NUMBER | SECOND USER TERMINAL RANDOM NUMBER | TITLE IDENTIFIER | ENCRYPTED TITLE KEY |
|---|---|---|---|---|
| 0 | 0 | 0 | 0 | 0 |
| ⋮ | ⋮ | ⋮ | ⋮ | ⋮ |

| USER TERMINAL IDENTIFIER | FIRST USER TERMINAL RANDOM NUMBER | SECOND USER TERMINAL RANDOM NUMBER | TITLE IDENTIFIER | ENCRYPTED TITLE KEY |
|---|---|---|---|---|
| TMIDa | TMRND1a | 0 | 0 | 0 |
| ⋮ | ⋮ | ⋮ | ⋮ | ⋮ |

| USER TERMINAL IDENTIFIER | FIRST USER TERMINAL RANDOM NUMBER | SECOND USER TERMINAL RANDOM NUMBER | TITLE IDENTIFIER | ENCRYPTED TITLE KEY |
|---|---|---|---|---|
| TMIDa | TMRND1a | TMRND2a | TLID1 | ENC(Ika,TLK1) |
| ⋮ | ⋮ | ⋮ | ⋮ | ⋮ |

| USER TERMINAL IDENTIFIER | FIRST USER TERMINAL RANDOM NUMBER | SECOND USER TERMINAL RANDOM NUMBER | TITLE IDENTIFIER | ENCRYPTED TITLE KEY |
|---|---|---|---|---|
| TMIDa | TMRND2a | 0 | 0 | 0 |
| ⋮ | ⋮ | ⋮ | ⋮ | ⋮ |

518  519  520  521  523

501

UNAUTHORIZED DEVICE DETECTION DEVICE, UNAUTHORIZED DEVICE DETECTION SYSTEM, UNAUTHORIZED DEVICE DETECTION METHOD, PROGRAM, RECORDING MEDIUM, AND DEVICE INFORMATION UPDATE METHOD

BACKGROUND OF THE INVENTION

1. Field of the Invention

The present invention relates to an unauthorized apparatus detection device for detecting unauthorized devices produced by copying, and in particular, to technology for detecting clone playback devices used to play copyrighted content such as movies and music.

2. Description of the Related Art

In recent years the existence of clone devices produced by copying authorized playback devices has become a major problem. To protect copyright, only authorized devices are permitted to decrypt and playback encrypted content. However, each clone device has a device key identical to that held by an authorized playback device, and decrypts and plays encrypted content using a method identical to that used by the authorized playback device. Anyone in possession of the clone device can therefore fraudulently watch and listen to the content.

With regard to this problem, Patent Document 1 discloses a method for detecting clone terminals in the case where the authorized mobile terminal is a mobile phone.

According to Patent Document 1, a clone terminal detection device judges that a clone terminal exists if two or more mobile terminals are detected to be simultaneously under the control of a plurality of base stations.

Patent Document 1: Japanese Patent Application publication No. 2000-184447

BRIEF SUMMARY DISCLOSURE OF THE INVENTION

However, the above technology is dependent upon each mobile terminal registering a current position with a base station, and, as a result, is inappropriate for a system including content playback devices that do not perform position registration.

In view of this problem, the present invention aims to provide an unauthorized apparatus detection device, a content playback device, an unauthorized apparatus detection system, a program, an information collecting device, an unauthorized apparatus detection method, a program, a recording medium, an apparatus information update method, and an integrated circuit, which are able to detect clones of content playback devices.

In order to achieve the above object, the unauthorized apparatus detection device of the present invention is an unauthorized apparatus detection device for detecting an unauthorized apparatus produced by copying, including: a distribution unit operable to store a first verification value in correspondence with a verification apparatus identifier, to generate a second verification value that differs from the first verification value, to store the second verification value in place of the first verification value, and to distribute the second verification value to an apparatus that is storing the verification apparatus identifier; an acquiring unit operable to acquire from a portable medium a target apparatus identifier and a verification value that have been written to the portable medium by a detection target apparatus; a judging unit operable, if the target apparatus identifier matches the verification apparatus identifier, to judge whether or not the acquired verification value matches the second verification value; and a registering unit operable, if the judging unit judges negatively, to register the target apparatus identifier on an unauthorized apparatus list.

The unauthorized apparatus detection device of the present invention judges whether the detection target apparatus storing a target apparatus identifier identical to the verification apparatus identifier stores an updated verification value. Consequently, it is possible to detect an irregular state in which i) an apparatus storing the verification apparatus identifier and pre-update verification value coexists with ii) another apparatus storing the verification apparatus identifier and the post-update verification value.

The registering unit registers the target apparatus identifier on an unauthorized apparatus list if the judging unit judges negatively. This registration of unauthorized apparatuses used herein refers to a concept for performing some kind of processing on non-matching apparatus identifiers.

For example, the unauthorized apparatus detection device may store a plurality of target apparatus identifiers in RAM, distinguish the target apparatus identifier corresponding to a non-matching random number from the other target apparatus identifiers, and transmit the result to a separately provided display unit. This operation is considered to (i) register the target apparatus identifiers corresponding to non-matching random numbers on an unauthorized apparatus list, and (ii) transmit the unauthorized apparatus list to the display unit. Note that it is sufficient to store the unauthorized apparatus list in volatile memory, rather than in non-volatile memory.

If the judging unit judges affirmatively, the distribution unit may be further operable to generate a third verification value that differs from the second verification value, store the third verification value in place of the second verification value, and distribute the third verification value to the detection target apparatus.

With this construction, the verification value of the detection target apparatus, which corresponds to the verification apparatus identifier, is updated. Consequently, the detection target apparatus and the unauthorized device detection apparatus can bother store a new verification value.

By repeating similar processing (i.e., by having the acquisition unit acquire the target apparatus identifier and the verification value and having the judgment unit judge whether the verification values match), the unauthorized apparatus detection device is able to detect unauthorized target apparatuses that are storing the verification target identifier, since the verification values of these devices will not be updated.

The present invention may be the unauthorized apparatus detection device further including: a title key storage unit operable to store a title key for decrypting encrypted content, wherein if the judging unit judges affirmatively, the distribution unit further distributes the title key to the detection target apparatus.

With this construction, only a detection target apparatus judged to be authorized apparatus is permitted to decrypt and play back the content, and, as a result, unauthorized playback can therefore be prevented.

The present invention may be the detection target apparatus storing therein a private key and the unauthorized apparatus detection device further including: a title key storage unit operable to store a title key for decrypting encoded content; a duplicate key storage unit operable to store, in correspondence with the verification apparatus identifier, a duplicate key that is a copy of the private key; and an encrypted title key generation unit operable to encrypt the title key using the duplicate key to generate an encrypted title key, wherein if the judging unit judges affirmatively, the distribution unit further distributes the encrypted title key to the detection target apparatus.

With this construction, only a detection target apparatus judged to be authorized apparatus can decrypt the title key, and, as a result, unauthorized playback can therefore be prevented.

The present invention may be the unauthorized apparatus detection device of, further including: a counting unit operable to count a number of affirmative judgments by the judging unit; and a count judging unit operable to judge whether the total number of affirmative judgments exceeds a predetermined number, wherein if the total number exceeds the predetermined number, the distribution unit is further operable to generate a third verification value that differs from the second verification value, to replace the first verification value with the third verification value, and to distribute the second verification value to the detection target apparatus.

The present invention may be the unauthorized apparatus detection device, further including: a period measuring unit operable to measure a period since a last verification value distribution by the distribution unit; and a period judging unit operable to judge whether the total period exceeds a predetermined period, wherein if the total period exceeds the predetermined period, the distribution unit is further operable to generate a third verification value that differs from the second verification value, replace the second verification value with the third verification value, and distribute the third verification value to the detection target apparatus.

These constructions reduce the number of times a new verification value is generated and updated, thereby reducing the amount of work needed for the update processing.

The distribution unit may be operable to generate a random number to use as each verification value.

This construction is able to reduce the risk of unauthorized playback resulting from the verification being guessed.

The content playback device of the present invention includes: a storage unit operable to store, in correspondence with an apparatus identifier, a first verification value generated by an unauthorized apparatus detection device for detecting an unauthorized apparatus produced by copying; a notification unit operable to notify the unauthorized apparatus detection device of the apparatus identifier and first verification value; an acquiring unit operable to acquire from a portable medium an apparatus identifier and a second verification value that have been written, in response to the notification, on the portable medium by the unauthorized apparatus detection device, the second verification value having been generated by the unauthorized apparatus detection device; and an update unit operable, if the acquired apparatus identifier matches the apparatus identifier stored in the storage unit, to replace the first verification value with the second verification value.

With this construction, the content playback device overwrites the stored verification value with the verification value generated by the unauthorized apparatus detection device. Consequently, the content playback device is able to inform the unauthorized detection device of the latest verification value generated by the unauthorized apparatus detection device. The authorized playback device is thus prevented from transmitting an old verification value and being mistakenly judged to be an unauthorized device.

An unauthorized apparatus detection system of the present invention is an unauthorized apparatus detection system that detects an unauthorized apparatus produced by copying, and includes an unauthorized apparatus detection device and a plurality of detection target apparatuses, each detection target apparatus including: a storage unit operable to store a first verification value in correspondence with a target apparatus identifier; a notification unit operable to notify the unauthorized apparatus detection device of the target apparatus identifier and the first verification value; an update information acquiring unit operable to acquire, from the unauthorized apparatus detection device, a verification apparatus identifier and a second verification value that is generated by the unauthorized apparatus detection device; and an update unit operable, if the verification apparatus identifier matches the target apparatus identifier, to replace the first verification value with the second verification value, and the unauthorized apparatus detection device including: a distribution unit operable to generate a second verification value that differs from a first verification value stored in correspondence with a verification apparatus identifier, to store the second verification value in correspondence with the verification apparatus identifier in place of the first verification value, and to distribute the verification apparatus identifier and the second verification value to an apparatus that is storing the verification apparatus identifier; an acquiring unit operable to acquire a target apparatus identifier and a verification value from any one of the detection target apparatuses; a judging unit operable, if the received target apparatus identifier matches the verification apparatus identifier, to judge whether or not the acquired verification value matches the second verification value, and a registering unit operable, if the judging unit judges negatively, to register the target apparatus identifier on an unauthorized apparatus list.

With this construction, the verification value is updated in an apparatus that is judged to be authorized. Further, the unauthorized device detection apparatus judges whether the detection target device, which is storing a target apparatus identifier identical to the verification apparatus identifier, is storing the updated verification value. The unauthorized device detection apparatus can thus detect the irregular state in which i) an apparatus that has been judged to be authorized coexists with ii) an apparatus storing the verification identifier and the pre-update verification value.

The notification unit may be further operable to write the target apparatus identifier and the first verification value to a portable medium, and the acquiring unit may be further operable to read the target apparatus identifier and the verification value from the portable medium via an information collecting device.

The information collecting device may include: a reading unit operable to read from the portable medium the target apparatus identifier and the verification value that are written in the portable medium; and a transmission unit operable to transmit the target apparatus identifier and the verification value, and the acquiring unit may acquire the target apparatus identifier and the verification value from the information collecting device.

With this construction, the information collection device acquires the verification value from detection target device via the portable medium, and transmits the verification value to the unauthorized apparatus detection device via a communications channel. Thus, even if the detection target apparatuses are geographically dispersed, the verification values stored by each detection target device can be collected together in the unauthorized apparatus detection device.

An information collecting device of the present invention is an information collecting device for transmitting, to an unauthorized apparatus detection device for detecting unauthorized apparatus produced by copying, information stored by a detection target apparatus that is a target of the detection, the detection target apparatus storing a target apparatus identifier and a verification value generated by the unauthorized apparatus detection device, and the unauthorized apparatus detection device generating the verification value, storing the generated verification value in correspondence with a verification apparatus identifier, acquiring a target apparatus identifier and a verification value, if the target apparatus identifier matches the verification apparatus identifier, judging whether the stored verification value matches the acquired verification value, and if judging negatively, registering the target apparatus identifier on an unauthorized apparatus list, the information collecting device including: a reading unit operable to read from the portable medium the target apparatus identifier and the verification value that have been written to the portable medium by the detection target apparatus; and a transmission unit operable to transmit the read target apparatus identifier and the read verification value to the unauthorized apparatus detection device.

With this construction, the verification value acquired from the detection target apparatus via the portable medium is transmitted to the unauthorized apparatus detection device via a communications channel. Thus, even if the detection target apparatuses are geographically dispersed, the verification values stored by each detection target device can be collected together in the unauthorized apparatus detection device.

An unauthorized apparatus detection method of the present invention is an unauthorized apparatus detection method for detecting an unauthorized apparatus produced by copying, including: distribution step of storing a first verification value in correspondence with a verification apparatus identifier, generating a second verification value that differs from the first verification value, storing the second verification value in place of the first verification value, and distributing the second verification value to an apparatus that is storing the verification apparatus identifier; an acquiring step of acquiring from a portable medium a target apparatus identifier and a verification value that have been written to the portable medium by a detection target apparatus; a judging step of, if the target apparatus identifier matches the verification apparatus identifier, judging whether or not the acquired verification value matches the second verification value; and a registering step of, if the judging unit judges negatively, registering the target apparatus identifier on an unauthorized apparatus list.

A computer program of the present invention is a computer program used in a storage unit-equipped unauthorized apparatus detection unit for detecting an unauthorized apparatus produced by copying, including: a distribution step of storing a first verification value in correspondence with a verification apparatus identifier, generating a second verification value that differs from the first verification value, storing the second verification value in place of the first verification value, and distributing the second verification value to an apparatus that is storing the verification apparatus identifier; an acquiring step of acquiring from a portable medium a target apparatus identifier and a verification value that have been written to the portable medium by a detection target apparatus; a judging step of, if the target apparatus identifier matches the verification apparatus identifier, judging whether or not the acquired verification value matches the second verification value; and a registering step of, if the judging unit judges negatively, registering the target apparatus identifier on an unauthorized apparatus list.

A recording medium of the present invention is computer readable, and has the computer program recorded thereon.

With this construction, the verification value stored by the apparatus is updated in apparatus that is judged to be authorized. The unauthorized apparatus detection device judges whether or not the detection target apparatus storing a target apparatus identifier identical to the verification apparatus identifier is storing the updated verification value. Consequently, the unauthorized apparatus detection device is able to detect the irregular state in which the apparatus judged to be authorized coexists with an apparatus storing the verification apparatus identifier and the pre-update verification value.

An apparatus information update method of the present invention is an apparatus information update method used by a content playback device for performing playback of content, the content playback device including a storage unit operable to store, in correspondence with an apparatus identifier, a first verification value generated by an unauthorized apparatus detection device for detecting an unauthorized apparatus produced by copying; and the apparatus information update method including: a notification step of notifying the unauthorized apparatus detection device of the apparatus identifier and first verification value; an acquiring step of acquiring from a portable medium an apparatus identifier and a second verification value that have been written, in response to the notification, on the portable medium by the unauthorized apparatus detection device, the second verification value having been generated by the unauthorized apparatus detection device; and an update step of, if the acquired apparatus identifier matches the apparatus identifier stored in the storage unit, replacing the first verification value with the second verification value.

A computer program of the present invention is a computer program used by a content playback device for performing playback of content, the content playback device including a storage unit operable to store, in correspondence with an apparatus identifier, a first verification value generated by an unauthorized apparatus detection device for detecting an unauthorized apparatus produced by copying; and the computer program including: a notification step of notifying the unauthorized apparatus detection device of the apparatus identifier and first verification value; an acquiring step of acquiring from a portable medium an apparatus identifier and a second verification value that have been written, in response to the notification, on the portable medium by the unauthorized apparatus detection device, the second verification value having been generated by the unauthorized apparatus detection device; and an update step of, if the acquired apparatus identifier matches the apparatus identifier stored in the storage unit, replacing the first verification value with the second verification value.

A recording medium of the present invention is a computer-readable recording medium having recorded thereon the computer program An integrated circuit of the present invention is an integrated circuit used content playback device for performing playback of content, including: a storage unit operable to store, in correspondence with an apparatus identifier, a first verification value generated by an unauthorized apparatus detection device for detecting an unauthorized apparatus produced by copying; a notification unit operable to notify the unauthorized apparatus detection device of the apparatus identifier and first verification value; an acquiring unit operable to acquire from a portable medium an apparatus identifier and a second verification value that have been written, in response to the notification, on the portable medium by the unauthorized apparatus detection device, the second verification value having been generated by the unauthorized apparatus detection device; and an update unit operable, if the acquired apparatus identifier matches the apparatus identifier stored in the storage unit, to replace the first verification value with the second verification value.

With this construction, the content playback device overwrites the stored verification value with the verification value generated by the unauthorized apparatus detection device. Consequently, the content playback device is able to communicate, to the unauthorized detection device, the latest verification value generated by the unauthorized apparatus detection device. The authorized playback device is thus prevented from transmitting an old verification value and being mistakenly judged to be an unauthorized device.

BRIEF DESCRIPTION OF THE DRAWINGS

FIGS. 3A to 3D show data structures of a second portable medium of the embodiment of the present invention;

DETAILED DESCRIPTION OF THE INVENTION

Figure 1:
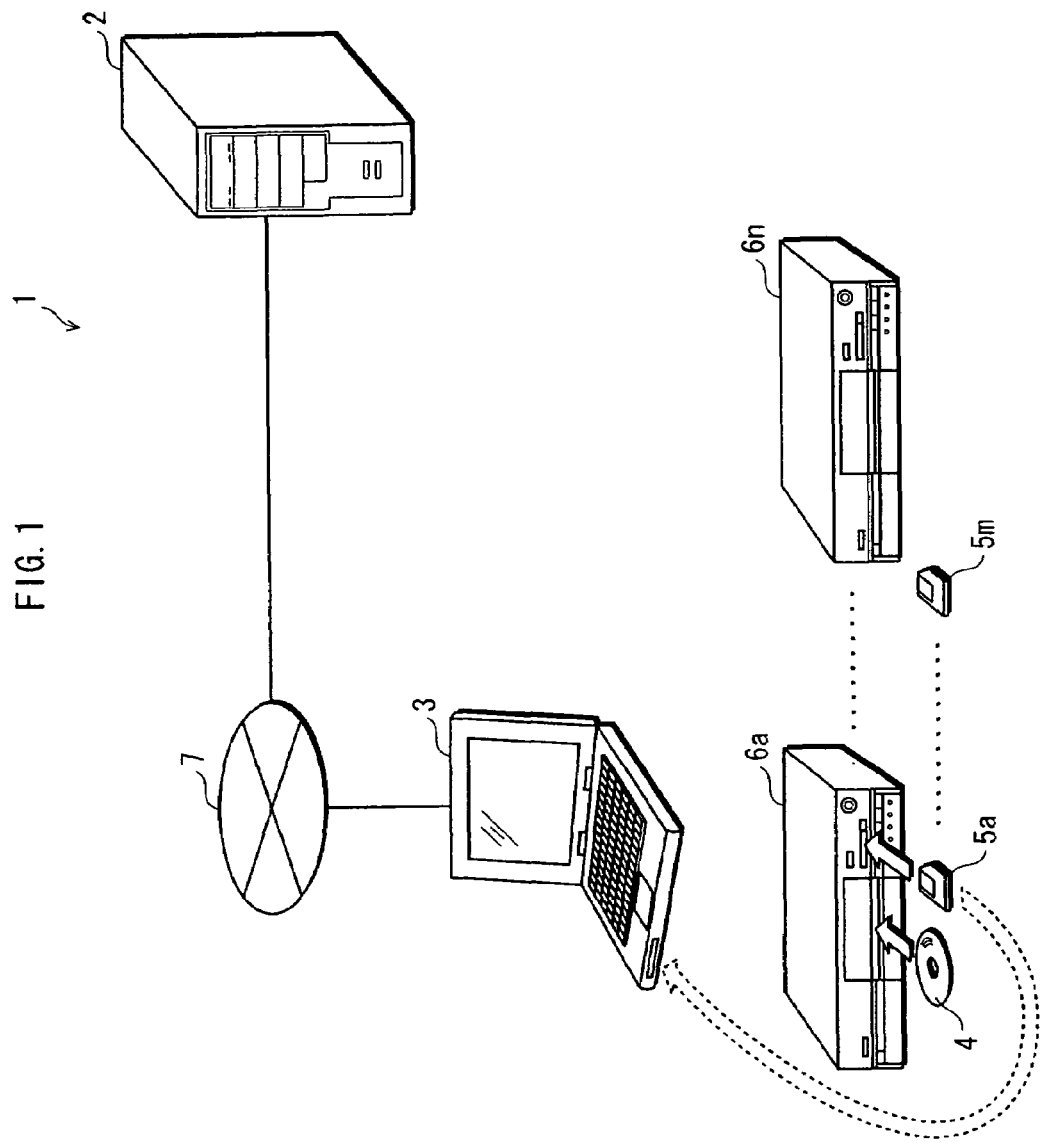
FIG. 1 shows the construction of a clone terminal finding system of an embodiment of the present invention.

The clone terminal finding system of a first embodiment of the present invention is a system for finding clone terminals which have been manufactured and sold by an unauthorized manufacturer or the like. These clone terminals are made by illegitimately copying a legitimately manufactured user terminal, such as a DVD player.

The following describes the clone terminal finding system with reference to the drawings.

The clone terminal finding system 1 of the first embodiment of the present invention is constructed from a management server 2, an information collection server 3, a first portable medium 4, second portable media 5a to 5m (where m is a natural number), user terminals 6a to 6n (where n is a natural number), and a communications channel 7.

The first portable medium 4 is an optical disk (such as a DVD-ROM) having recorded thereon moving picture content that has been encrypted using a title key. The first portable medium is sold in retail outlets.

The second portable media 5a to 5m are rewritable portable media (such as SD cards) each capable of storing a key and terminal information. The key is required to decode the encrypted moving picture content recorded on the first portable medium 4, while the terminal information relates to the user terminal and is required to find clone terminals. The second portable media 5a to 5m are used to transfer data back and forth between the information collection server 3 and the user terminals 6a to 6n.

The user terminals 6a to 6n are playback devices (such as DVD players) for decrypting and playing back the moving picture content recorded on the first portable media 4. Each of the terminals 6a to 6n stores a pre-allocated private key, generates the title key for the encrypted moving picture content using the private key and information stored on a corresponding one of the second portable media 5a to 5n, decrypts the encrypted content, and plays back the result.

The information collection server 3 is a computer device installed in the retail outlet that sells the first portable medium 4, and is capable of reading data from and writing data to the second portable media 5a to 5m. When one of the second portable media 5a to 5m is inserted, the information collection server 3 reads the recorded terminal information, transmits the read terminal information to the management server 2 which is connected via a communication channel 7 in a network, acquires in response information from the management server 2, and writes the acquired information to the inserted second portable medium.

The management server 2 is a computer terminal for finding clone terminals. On receipt of terminal information pertaining to one of the user terminals 6a to 6n from the information collection server 3 via the communication channel 7, the management server 2 judges whether the user terminal indicated by the acquired terminal information is a clone terminal. If judging in the negative, the management server 2 generates an encrypted title key, which is an encrypted version of the title key for the moving picture content, updates information for updating the terminal information stored by the user terminal, and transmits the encrypted title key and the update information to the information collection server 3. The clone terminal is assumed to be a copy and to have stored therein a private key identical to the one stored by the legitimate user terminal used to make the copy. Processing relating to the judgment as to whether a given terminal is a clone terminal is described below.

The processing for discovering a clone terminal is described below with reference to an example in which the user, who wishes to buy and play back the content, is in possession of the user terminal 6a and the second portable medium 5a.

Firstly, the user inserts the second portable medium 5a into the user terminal 6a. The user terminal 6a writes terminal information, including a user terminal identifier and the like, to the second portable medium 5a.

Next, the user takes the second portable medium 5a to a retail outlet, and inserts the second portable medium 5a into the information collection server 3, which is installed at the retail outlet.

The information collection server 3 reads the terminal information from the second portable medium 5a, and transmits the terminal information to the management server 2.

Based on the terminal information, the management server 2 judges whether the user terminal of the terminal information is a clone terminal. If judging in the negative, the management server 2 generates an encrypted title key by encrypting the title key using a private key of the user terminal. The title key is the key used to encrypt the moving picture content recorded on the first portable medium 4. Note also that the private key for the user terminal corresponds to the terminal information. The management server 2 further generates update information for updating the terminal information stored by the user terminal, and transmits the encrypted title key and the update information to the information collection server 3.

The information collection server 3 writes the encrypted title key and the update information to the second portable medium 5a.

The user takes home the second portable medium 5a and the purchased first portable medium 4, and inserts the first portable medium 4 and the second portable medium 5a into the user terminal 6a.

The user terminal 6a decrypts the encrypted title key to generate the title key, decrypts the encrypted moving picture content recorded on the first portable medium 4, plays back the result. The user terminal 6a also updates the stored terminal information based on the update information.

Construction

Construction of First Portable Medium 4

The first portable medium 4 is a DVD-ROM having recorded thereon a title identifier and encrypted content corresponding to the content identified by the title identifier.

The title identifier uniquely specifies a title of a movie or song stored on the first portable medium 4, using a serial number (1, 2, 3, . . . ) or the like. The content is encoded in a format, such as the MPEG 2 (Moving Picture Expert Group) format, which the user terminals are able to decode and play back or output to an external unit.

Figure 2:
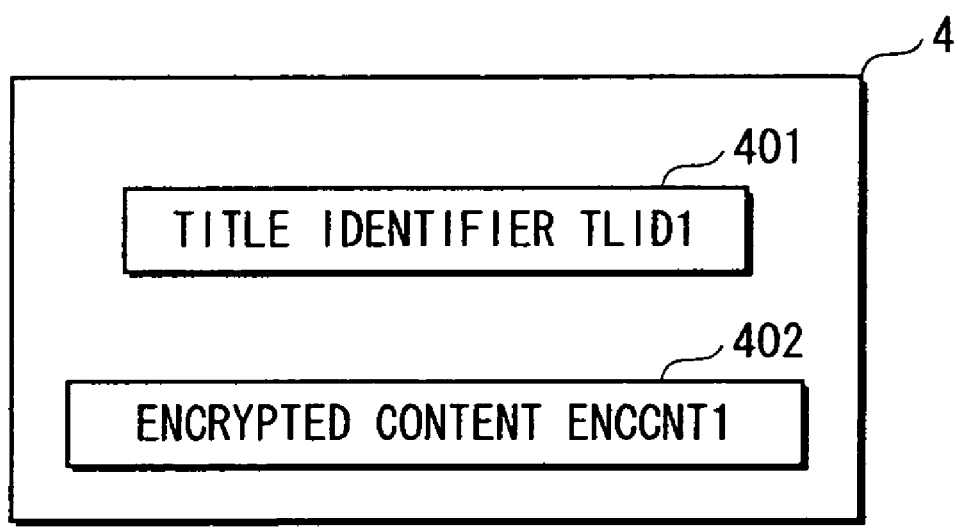
FIG. 2 shows a data structure of a first portable medium of the embodiment of the present invention.

The first portable medium 4 may, for instance, store the title identifier 401 "TLID1" and the encrypted content 402 "ENC-CNT1", as shown in FIG. 2.

The ENCCNT1 is content "CNT1" encrypted using a title key "TLK1" that corresponds to a title identifier "TLID1". ENCCNT1 can be expressed as Enc(TLK1, CNT1), where Enc (K, P) indicates a ciphertext obtained by encrypting a plain text P using an encryption key K.

The encryption and decryption rely on a private key encryption method. In the present embodiment, the encryption may be block encryption AES. Since AES is a well-known method, a description of AES is omitted.

Construction of Second Portable Medium 5a

The second portable medium 5a is an SD card, and stores a user terminal table.

The user terminal table is constructed from at one or more pieces of user terminal information. Each piece of user terminal information includes a user terminal identifier, a first user terminal random number, a second user terminal random number, a title identifier, and an encrypted title key.

The user terminal identifier uniquely identifies one of the user terminals 6a to 6n.

The first user terminal random number is a random number that the user terminal corresponding to the user terminal identifier was storing when the second portable medium 5a was last inserted. The user terminal writes the first random number to the second portable medium 5a at this time.

The second user terminal random number is generated by the management server 2 in order to update the first random number stored by the user terminal. The second user terminal random number is written to the second portable medium by the information collection server 3, which receives the second user terminal random number from the management server 2.

The title identifier uniquely identifies the content recorded on the first portable medium 4, and is written to the second portable medium 5a by the information collection server 3.

The encrypted title key is obtained by encrypting the title key that corresponds to the title identifier, using a private key stored by the user terminal identified by the user terminal identifier.

The first user terminal random number, the second user terminal random number, the private key, and the title key may all be 128-bit natural numbers.

A value of "0" for the second user terminal random number indicates that an update of the first terminal random number stored in the user terminal is not required. A value of "0" for the encrypted title key indicates that the encrypted title key is either invalid or not recorded.

The second portable medium 5a may store a user terminal table 501, as shown in FIG. 3C. The user terminal table 501 includes pieces of user terminal information 531 each constructed from a user terminal identifier 511 "TMIDa", a first user terminal random number 512 "TMRND1a", a second user terminal random number "TMRDN2a", a title key "TLID1", and an encrypted title key "Enc(IKa, TLK1).

Construction of Management Server 2

Figure 4:
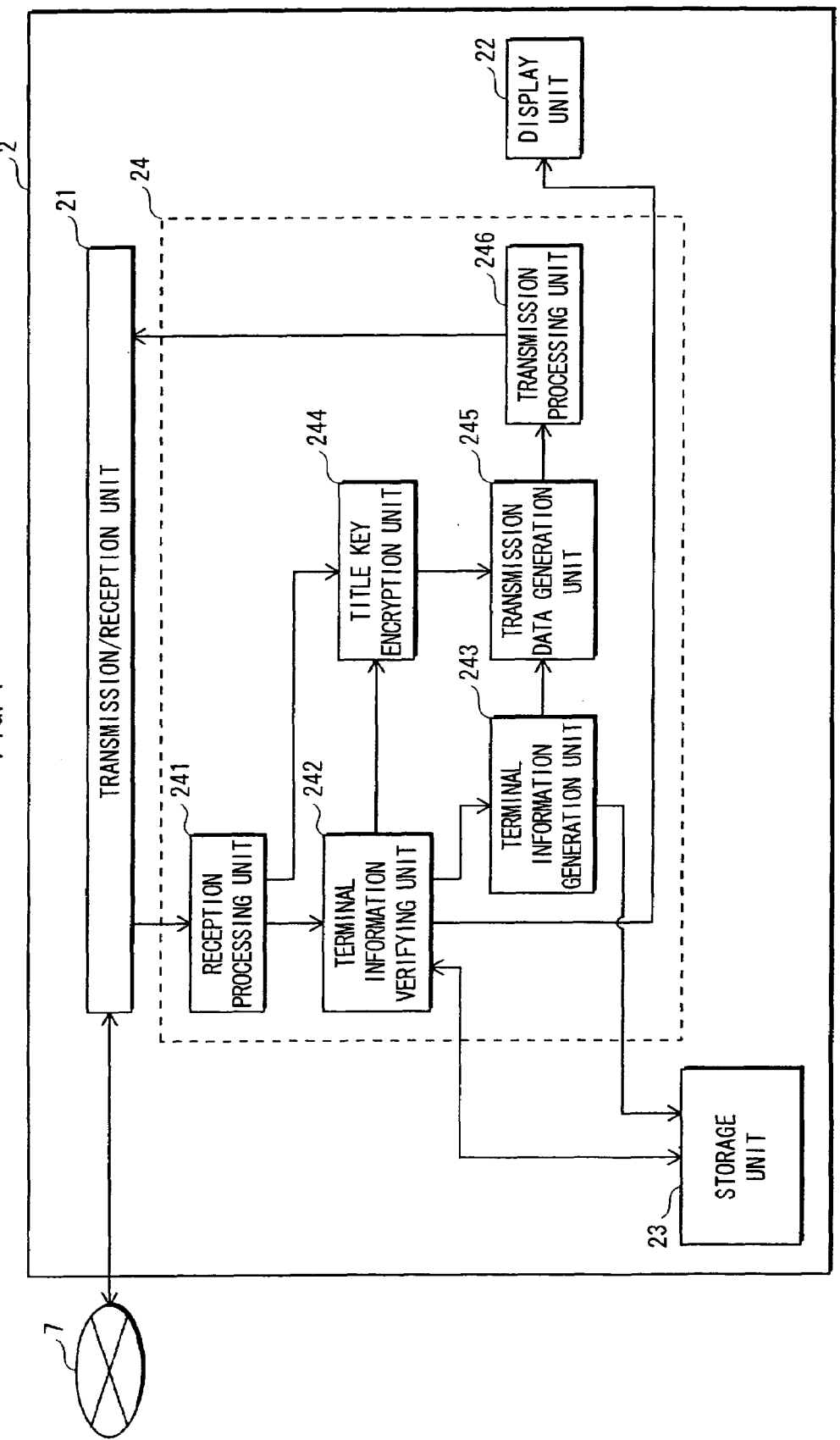
FIG. 4 is a block diagram showing a construction of a management server of the embodiment of the present invention.

The management server 2 is constructed from a transmission/reception unit 21, a display unit 22, a storage unit 23, and a control unit 24, as shown in FIG. 4.

The management server 2 is realized using a computer system constructed from a microprocessor, ROM, RAM, a hard disk unit, a display unit, a keyboard, a mouse, a modem, and the like. A program is stored in the RAM and/or in the hard disk unit. The management server 2 realizes its functions by the processor operating in accordance with the computer program.

The transmission/reception unit 21 is a modem or the like which exchanges data with the information collection server 3 via the communication channel 7 using a communication protocol such as TCP/IP.

The display unit 22 is a display device such as a liquid crystal display. On receipt of a display instruction from the control unit 24, the display unit 22 displays a screen based on the instruction.

Figure 5:
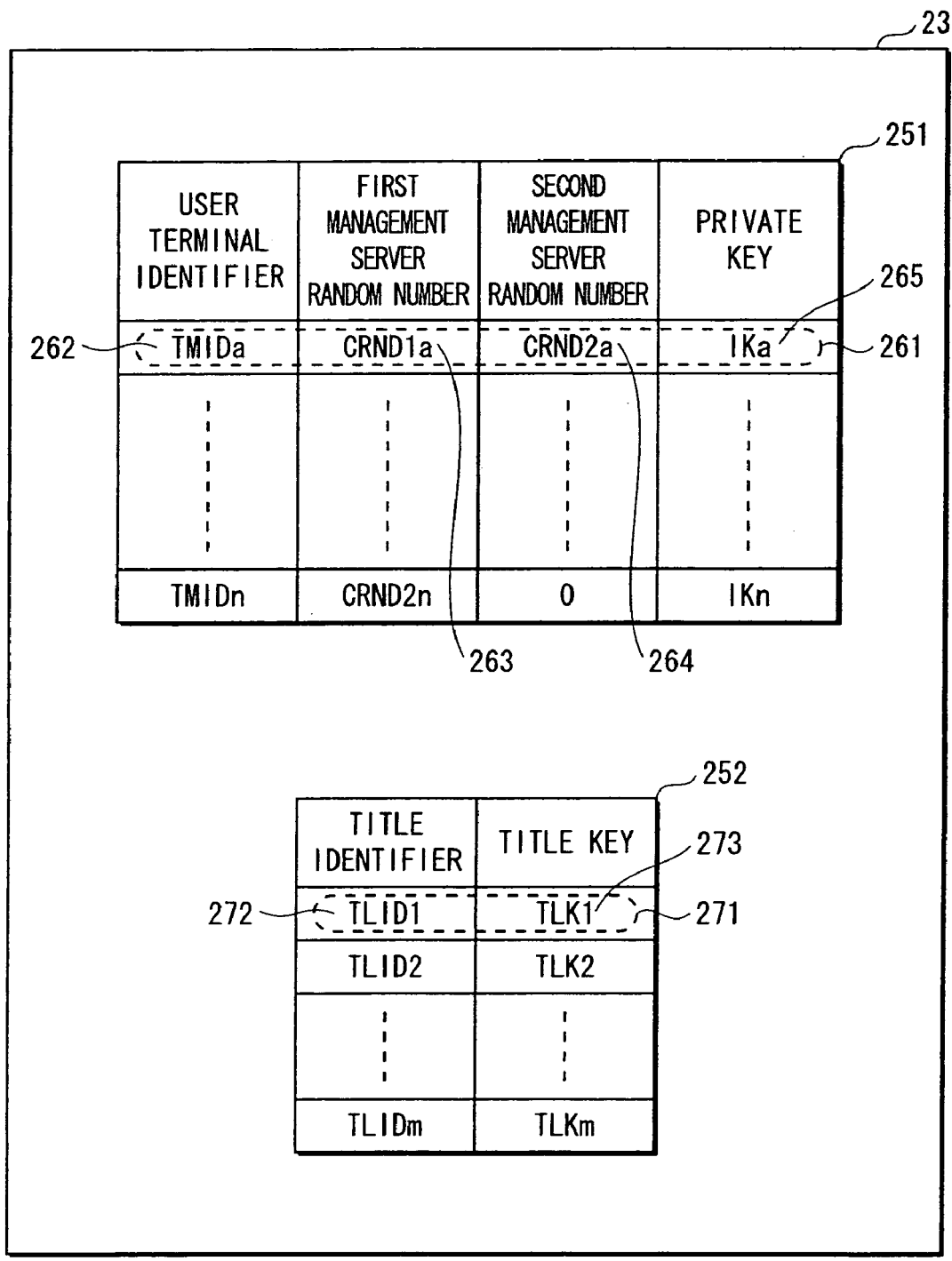
FIG. 5 shows a data structure stored in a storage unit of the management server of the embodiment of the present invention.

The storage unit 23 stores a terminal management table 251, and a title management table 252, as shown in FIG. 5.

The terminal management table 251 is constructed from a plurality of pieces of terminal information. Each piece includes a user terminal identifier, a first management server random number, a second management server random number, and a private key.

The user terminal identifier identifies one of the user terminals 6a to 6n.

The following describes TMIDx, which is the value of a user terminal identifier that identifies a user terminal 6x (where x is in the range a to n).

The second management server random number is generated by the terminal information generation unit 243, which is described in a later section, and is used to update the user terminal random number held by the user terminal. The first management server random number is the random number generated by the terminal information generation unit 243 directly before the second management server random number.

The first management server random number and the second management server random number may be 128-bit natural numbers. A value of "0" indicates that the second user terminal random number is invalid.

The private keys are unique device keys, each of which is assigned to a different one of the user terminals. A private key IKa is assigned to the user terminal 6a, a private key Ikb to the user terminal 6b, and so on. Lastly, a private key Ikn is assigned to the user terminal 6n.

The terminal management table 251 may include a piece of terminal management information 261, as shown in FIG. 5. The piece of terminal information 261 contains a user terminal identifier 262, which takes a value "TMIDa" indicating the user terminal 6a, a first management server random number 263 "CRND1a", a second management server random number 264 "CRND2a", and the private key 265 "IKa".

Every time an authorized user terminal is manufactured, a piece of terminal information corresponding to a new user terminal is added to the terminal information table 251.

The title management table 252 is made up of a plurality of pieces of title management information each including a title identifier and a title key.

The title identifier identifies content, and the title key is for encrypting and decrypting the content identified by the title key.

The title management table 252 may include a piece of title management information 271, as shown in FIG. 5. The piece of title management information 271 contains a title identifier 272 "TLID1", and a title key 273, which is a title key for the content identified by TLID1.

For every new piece of content generated by content producers, a corresponding piece of title management information is added to the title management table 252.

As shown in FIG. 4, the control unit 24 is constructed from a reception processing unit 241, a terminal information verifying unit 242, a terminal information generation unit 243, a title key encryption unit 244, a transmission data generation unit 245, and a transmission processing unit 246. The control unit 24 is, for example, a special-purpose microcomputer, which includes each of the above functional units. Each unit may be realized by a program written in mask ROM of the microcomputer. Alternatively, each unit may be an independent microcomputer.

The reception processing unit 241 receives the user terminal identifier, the first user terminal random number, and the title identifier from the information server 3 via the transmission/reception unit 21. The reception processing unit then outputs the received user terminal identifier and first user terminal random number to the terminal information verifying unit 242, and outputs the user terminal identifier and the title identifier to the title key encryption unit 244.

The terminal information verifying unit 242 receives the user terminal identifier and the first user terminal random number from the reception processing unit 241. The terminal information verifying unit 242 then acquires the first management server random number that is in correspondence with the received user terminal identifier from a storage unit 23. Moreover, if the second management server random number corresponding to the user terminal identifier is stored in the storage unit 23, the terminal information verifying unit 242 further acquires the second management server random number.

In the case where the second management server random number is stored in the storage unit 23, the terminal information verifying unit 242 verifies whether or not the first user terminal random number matches the second management server random number.

If there is a match, the terminal information verifying unit 242 copies the value or the second management server random number over value of the first management server random number that is stored in the storage unit 23, and then deletes the second management server random number. The terminal information verifying unit 242 then outputs the user terminal identifier to the terminal information generation unit 243, and outputs an encrypted key generation request to the title key encryption unit 244.

When the second management server random number is stored, but the first user terminal random number fails to match the second management server random number, or when the second management server random number is not stored, the terminal information verifying unit verifies whether the first user terminal random number matches the first management server random number.

If the first user terminal random number fails to match the first management server random number, the terminal information verifying unit 242 causes the display unit 22 to display a screen indicating that the user terminal corresponding to the user terminal identifier is a clone. If, on the other hand, the first user terminal random number matches the first management server random number, the terminal information verifying unit 242 outputs the user terminal identifier to the terminal information generation unit 243, and outputs an encrypted title key generation request to the title key encryption unit 244.

The terminal information generation unit 243 receives the user terminal identifier from the terminal information verifying unit 242, generates a random number, and writes the generated random number over the second management server random number, which is stored in the storage unit 23 in correspondence with the user terminal identifier. The terminal information generation unit 243 further outputs the same random number to the transmission data generation unit 245 as a second user terminal random number. Here, the random number must be different from the one generated immediately before the random number. Also, since the method for generating the random number is a well-known, a description is omitted.

The title key encryption unit 244 receives the user terminal identifier from the reception processing unit 241, and receives the encrypted title key request from the terminal information verifying unit 242. The title key encryption unit 244 then acquires the private key corresponding to the user terminal identifier from the terminal management table 252 stored in the storage unit 23. Next the title key encryption unit 244 encrypts the title key based on the acquired private key to generate an encrypted title key, and outputs the received title and the encrypted title key to the transmission data generation unit 245.

The transmission data generation unit 245 receives the second user terminal random number from the terminal information generation unit 243, and receives the title identifier and the encrypted title key from the title key encryption unit 244. The transmission generation unit 245 then generates update information data including the received second user terminal random number, the title identifier and the encrypted title key, and transmits the update information data to the transmission processing unit 246.

The transmission processing unit 246 receives the update instruction data from the transmission data generation unit 245, and transmits the update instruction data to the information collection server 3 via the transmission/reception unit 21.

Construction of Information Collection Server

Figure 7:
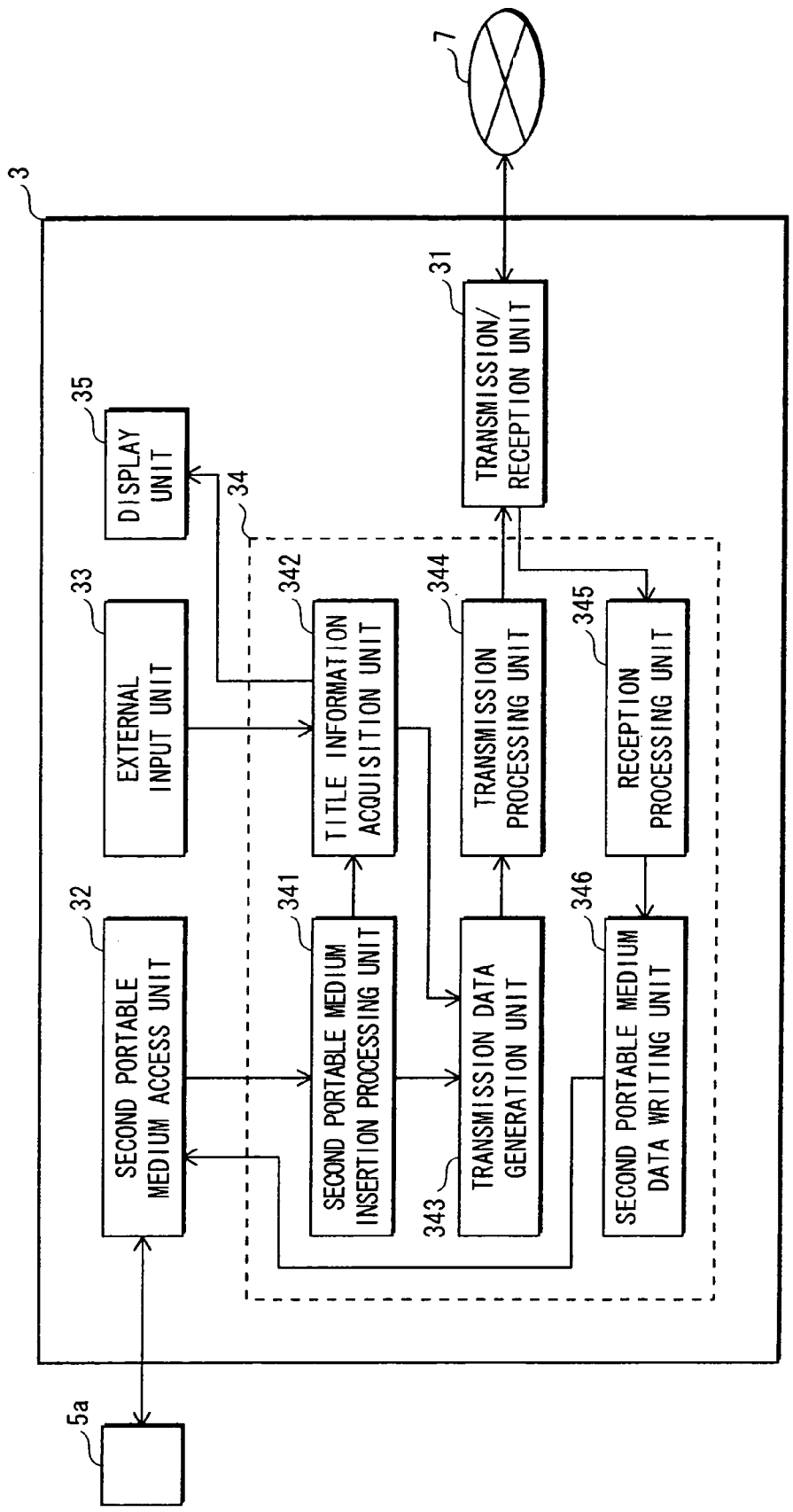
FIG. 7 is a block diagram showing a construction of an information collection server of the embodiment of the present invention.

The information collection server 3 is constructed from a transmission/reception unit 31, a second portable medium access unit 32, an external input unit 33 and a control unit 34, as shown in FIG. 7.

The transmission/reception unit 31 is a modem or the like, and communicates data with the management server 2, via the communications channel 7, using TCP/IP communications protocol or the like.

The second portable medium access unit 32 is an SD card reader, and transmits insertion notification to the control unit 34 when insertion of the second portable medium into an SD card slot (not depicted) is detected. The SD card slot is provided in the information collection server 3. The second portable medium access unit 32 further acquires data from and writes data to the inserted second portable medium.

The external input unit 33 is an input device used by a user to input the title identifier. The input device permits input of the numbers 0 to 9 and/or the letters A to Z, and may be a keyboard, a keypad, a mouse, or the like. The external input device transmits an inputted title identifier to the control unit 34.

In the present embodiment, the inputted title identifier is assumed to be the TLID1.

The display unit 35 is a display device such as a liquid crystal display. The display unit 35 receives a display instruction from the control unit 34, and displays a screen based on the display instruction.

The control unit 34 includes a second portable medium insertion processing unit 341, a title information acquisition unit 342, a transmission data generation unit 343, a transmission processing unit 344, a reception processing unit 345, and a second portable medium data writing unit 346.

The control unit 34 is a special-purpose microcomputer or the like including each of the functional units. Each of the functional units may be written in the mask ROM of the microcomputer. Alternatively, each of the function units may be an independent microcomputer.

On receipt of the insertion notification from the second portable medium access unit 32, the second portable medium insertion processing unit 341, acquires the user terminal identifier and the first user terminal random number, which are recorded on the second portable medium, via the second portable medium access unit 32.

The second portable medium insertion processing unit 341 then outputs the acquired user terminal identifier and first user terminal random number to the transmission data generation unit 343, and outputs a title information request to the title information acquisition unit 342.

On receipt of the title information request from the second portable medium insertion processing unit 341, the title information acquisition unit 342 transmits, to the display 35, an instruction to display a message prompting the user to input the title identifier, causing the display 35 to display the message. Next, due to user input to the external input unit 33, the title information acquisition unit receives the title identifier, and outputs the acquired title identifier to the transmission data generation unit 343.

The transmission data generation unit 343, acquires the user terminal identifier and the first user terminal random number from the second portable medium insertion processing unit 341, and acquires the title identifier from the title information acquisition unit 342.

Next, the transmission data generation unit 343 generates transmission data for transmission to the management server 2. The transmission data includes the acquired user terminal identifier, the first user terminal random number and the user title identifier. The transmission data generation unit 343 then outputs the transmission data to the transmission processing unit 344.

The transmission processing unit 344, receives the transmission data from the transmission data generation unit 343, and transmits the transmission data to the management server 2 via the transmission/reception unit 31.

The reception processing unit 345 receives the update instruction data, which includes the second user terminal random number, the title identifier, and the encrypted title key, from the management server 2 via the transmission/reception unit 31, and outputs the second user terminal random number, the title identifier, and the encrypted title key to the second portable medium data writing unit 346.

The second portable medium writing unit 346 receives the second user terminal random number, the title identifier and the encrypted title key, and records the received second user terminal random number, the title identifier and the encrypted title key on the second portable medium via the second portable medium access unit 32.

Construction of User Terminal 6a

The user terminal 6a is constructed from a second portable medium access unit 61, a first portable medium access unit 62, an output unit 63, a storage unit 64, and a control unit 65.

The second portable medium access unit 61 is an SD card reader provided in the user terminal 6a, and transmits insertion notification to the control unit 65 when insertion of the second portable medium into an SD card slot (not depicted) is detected. The second portable medium access unit 32 further reads data from and writes data to the inserted second portable medium.

The first portable medium access unit 62 is a DVD drive provided in the user terminal 6a, and transmits insertion notification to the control unit 65 when insertion of the first portable medium into the DVD drive (not depicted) is detected. The first portable medium access unit 62 further reads data from and writes data to the inserted first portable medium.

The output unit 63 is a display adaptor, and is connected to an external display such as a liquid crystal or plasma display.

The storage unit 64 stores the user terminal identifier, the private key, a terminal stored random number, and a title information table.

The user terminal identifier identifies the user terminal, and is written to the user terminal before shipping.

The private key is different for every user terminal, and is written to the user terminal before shipping.

The terminal stored random number is used by the management server 2 to detect clone terminals, and is given an initial value of 0 before the user terminal is shipped.

The title information table is constructed from at least one piece of title information, each piece including a title identifier and a title key. The title key is used to encrypt and decrypt the content identified by the title identifier.

When new title information is acquired, the acquired title information is added to the title information table.

Figure 10:
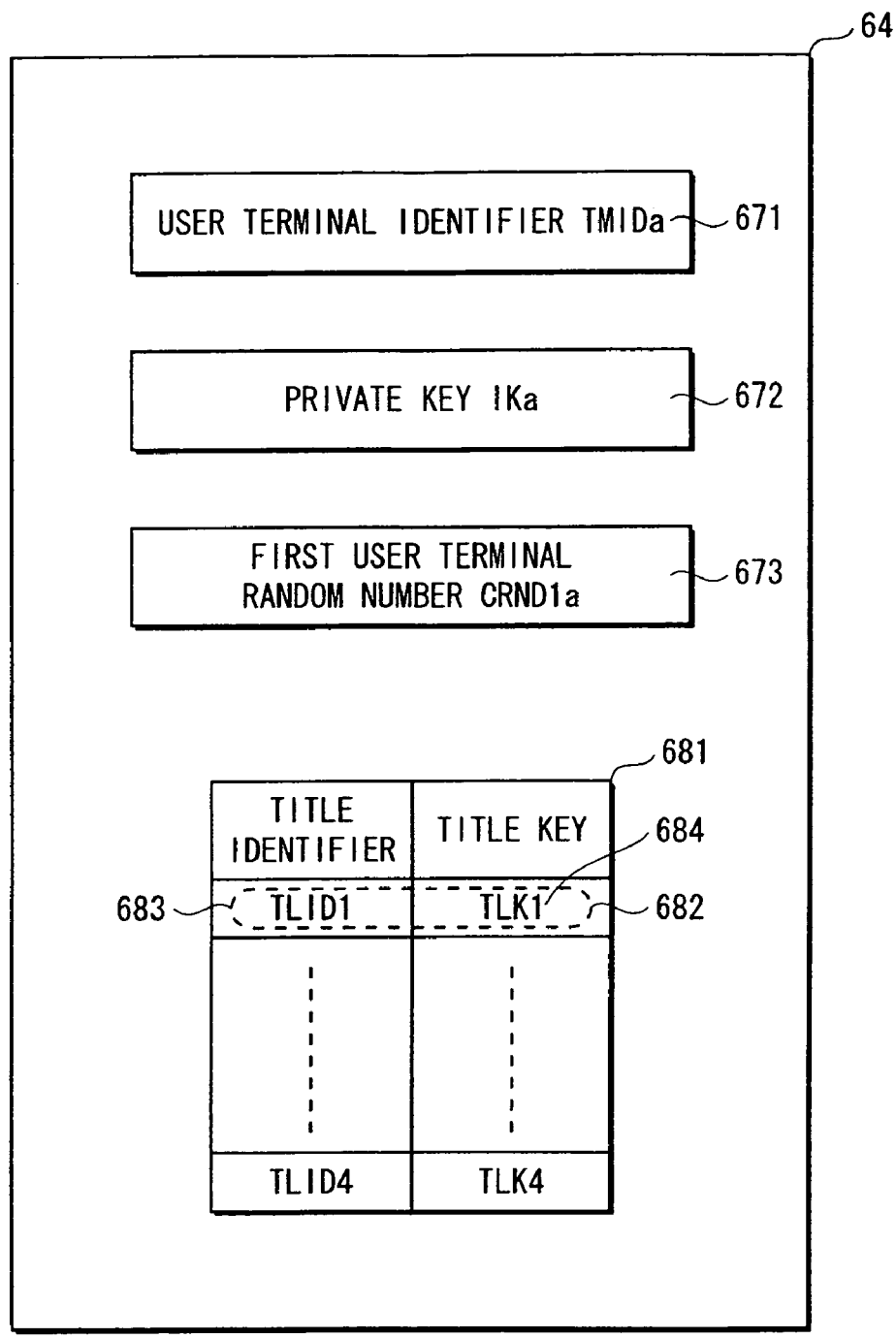
FIG. 10 shows a data structure stored in the storage unit of the embodiment of the present invention.

The storage unit 64 stores, for instance, a user terminal identifier 671 "TMIDa", a private key 672 "IKa", a terminal stored random number 673 "CRND1a", and a title information table 681, as shown in FIG. 10. The title information table 681 includes a piece of title information 682 made up of a title identifier 683 "TLID1" and a title key 684 "TLK1" for encrypting and decrypting the content identified by TLID1.

The control unit 65 is constructed from a second portable medium insertion processing unit 651, a terminal information writing unit 652, an encrypted title key decryption unit 653, a terminal information update unit 654, a first portable medium insertion processing unit 655, and a descramble processing unit 656.

The control unit 65 is a special-purpose microcomputer, or the like, which includes each of the above functional units. Each unit may be realized by a program written in the mask ROM of the microcomputer. Alternatively, each unit may be an independent microcomputer.

On receipt of the insertion notification from the second portable medium access unit 61, the second portable medium insertion processing unit 651 acquires the user terminal identifier 671 "TMIDa", which is stored in the storage unit 64.

Next, the second portable medium insertion processing unit 651 verifies, via the second portable medium access unit 61, whether or not a user terminal identifier having a value of "TMIDa" is recorded on the second portable medium. When the user identifier having a value of "TMIDa" is not recorded on the second portable medium, the second portable medium insertion processing unit 651 outputs the user terminal identifier to the terminal information writing unit 652, and ends the processing.

On the other hand, when the user terminal identifier having a value of "TMIDa" is recorded on the second portable medium, the second portable medium insertion processing unit 651 verifies whether or not the second user terminal random number, the title identifier, and the encryption title key are recorded in correspondence to the user terminal identifier "TMIDa".

If the second user terminal random number is recorded in correspondence with the user terminal identifier "TMIDa" on the second portable medium, the second portable medium insertion processing unit 651 outputs the read second user terminal random number to the terminal information update unit 654, overwrites the value of the first user terminal random number with the value of the second user terminal random number in the storage unit 64, and deletes the second user terminal random number.

If the title identifier and encrypted title key are recorded on the second portable medium in correspondence to the user terminal identifier "TMIDa", the second portable medium insertion processing unit 651 reads the title identifier and the encrypted title key from the second portable medium via the second portable medium access unit 61, outputs the read title identifier and encrypted title key to the encrypted title key decryption unit 653, and deletes the title identifier and the encrypted title key from the second portable medium.

The encrypted title key decryption unit 653 receives the title identifier and the encrypted title key from the second portable medium insertion processing unit 651, and acquires the private key IKa from the storage unit 64.

Next, the encrypted title key decryption unit 653 obtains the title key by decrypting the encrypted title key using the private key IKa, and adds the title identifier and the title key to the title information table 681.

The terminal information update unit 654 acquires the second user terminal random number from the second portable medium insertion processing unit 651, and updates the value of terminal stored random number stored in the storage unit 64 with the value of the acquired second user terminal random number.

The first portable medium insertion processing unit 655 receives insertion notification from the first portable medium access unit 62, and acquires the title identifier recorded on the first portable medium 4 via the first portable medium access unit 62.

Next, the first portable medium insertion processing unit 655 judges whether or not the title key corresponding to the acquired title identifier is stored in the title information table 681 in the storage unit 64, and if judging in the affirmative, acquires the title key from the storage unit 64, and outputs the acquired title key to the descramble processing unit 656.

The descramble processing unit 656 receives the title key from the first portable medium insertion processing unit 655 sequentially acquires the encrypted content recorded on the first portable medium 4 via the first portable medium access unit 62, sequentially descrambles the encrypted content using the title key, and sequentially outputs the result to the exterior via the output unit 63.

Though the above describes the construction of the user terminal 6a, the other user terminals differ only in having TMIDb to TMIDn as user terminal identifiers and IKb to IKn as private keys. Descriptions of the other terminals are therefore omitted.

Operation

The following describes the operations of the clone terminal finding system 1, including, in order of appearance, (1) initial setting and update operations, (2) content purchasing operations, and (3) content playback operations.

The initial setting and update operations of (1) are the operations performed when a user is in possession of both the second portable medium 5a and the user terminal 6a, and plays back the content by inserting the former into the latter. The content purchasing operations of (2) are the operations performed when the user takes the second portable medium 5a to a retail outlet, purchases the first portable medium 4, and inserts the second portable medium into the information collection server 3 installed at the retail outlet. The content playback operations of (3) are the operations performed when the user returns home with the purchased first portable medium 4 and, in order to view the content, inserts the first portable medium 4 and the second portable medium 5 into the user terminal 6a.

(1) Initial Setting and Update Processing

Figure 11:
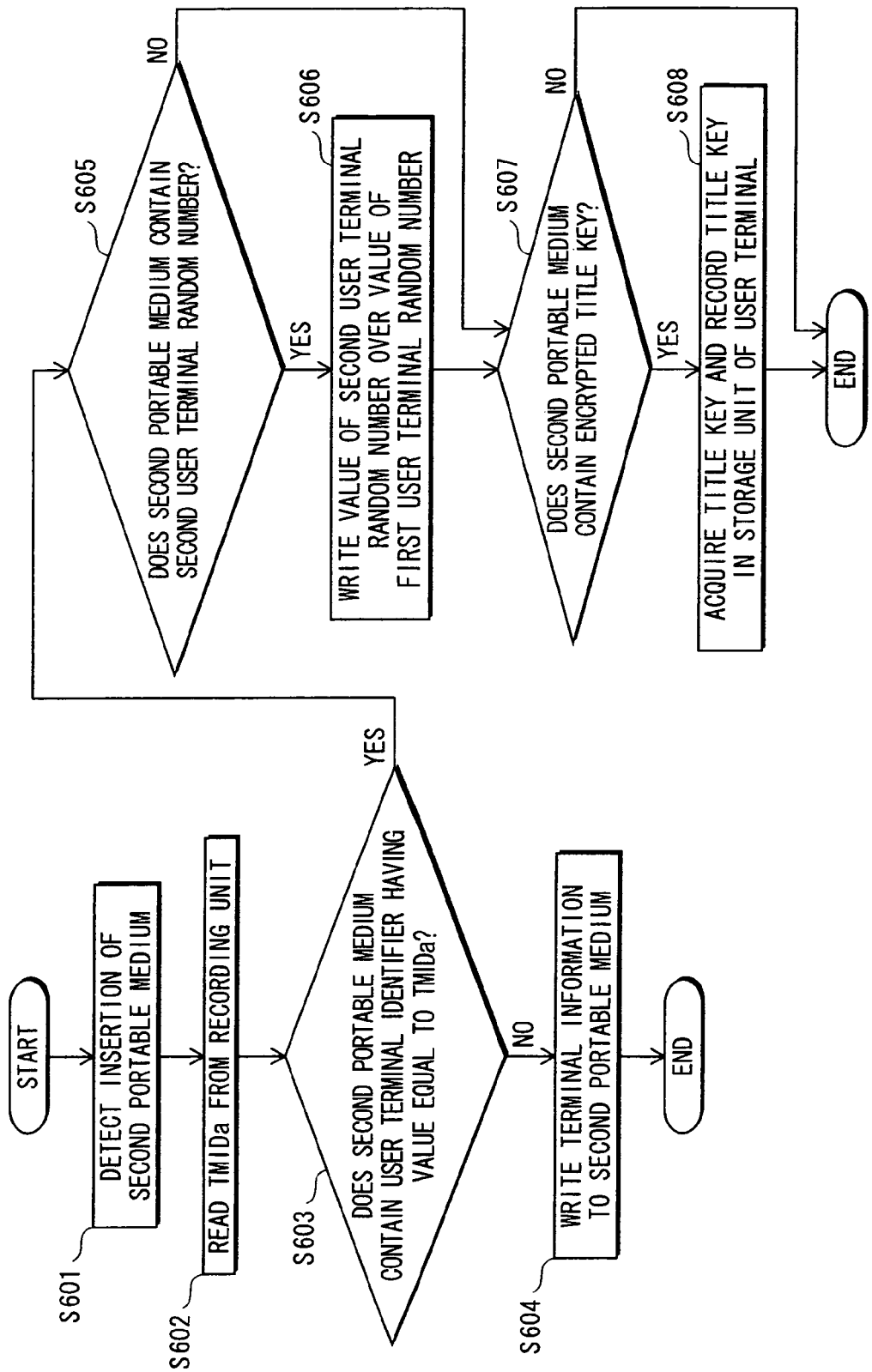
FIG. 11 is a flowchart showing initial setting operations and update operations of the embodiment of the present invention, when the second portable medium from the user terminal is inserted.

The initial setting and update operations are described below with reference to FIG. 11.

Here, it is assumed that a user wishing to purchase the contents is in possession of the user terminal 6a and the second portable medium 5a. The value TMIDa is assumed to be written as the user terminal identifier into the storage unit 64 in the user terminal 6a at shipping. Similarly, IKa is assumed to be written as the private key 672, and CRND1a as the first user terminal random number 673. It is further assumed that user terminal table 501 is empty of data, as shown in FIG. 3A.

First, the user inserts the second portable medium 5a into the card slot of the user terminal 6a.

The second portable medium access unit 61 detects the insertion, and transmits the insertion notification to the second portable medium insertion processing unit 651 (Step S601).

On receipt of the insertion notification, the second portable medium insertion processing unit 651 reads the user terminal identifier 671 "TMIDa" from the storage unit 64 (Step S602).

The second portable medium insertion processing unit 651 then searches the data in the second portable medium via the second portable medium access unit 651, and judges whether or not a user terminal identifier of the same value (i.e., TMIDa) is recorded (Step S603).

If a user terminal identifier having a value of TMIDa is not recorded on the second portable medium 5a (NO in Step S603), the second portable medium insertion processing unit 651 outputs the user terminal identifier TMIDa to the terminal information writing unit 652. The terminal information writing unit 652 receives the user terminal identifier TMIDa from the second portable medium insertion processing unit 651.

The terminal information writing unit 652 then reads the first user terminal random number 673 "TMRND1a", and records the user terminal identifier 671 and the first user terminal random number 673 in the user terminal table in the second portable medium 5a via the second portable medium access unit 61, and ends the processing (Step S604).

At this stage, the user terminal table 501 recorded in the second portable medium 5a is in the state shown in FIG. 3B.

On the other hand, if a user terminal identifier having a value of TMIDa is recorded on the second portable medium 5*a* (YES in Step S603), the second portable medium insertion processing unit 651 judges whether or not the second user terminal random number corresponding to the user terminal identifier "TMIDa" is recorded on the second portable medium 5*a* (Step S605), and if judging in the negative (NO in Step S605), proceeds to Step S607, which is described below.

If judging that the second user terminal random number corresponding to the user terminal identifier "TMIDa" is recorded (YES in Step S605), the user terminal table 501 recorded in the second portable medium 5*a* is in the state shown in FIG. 3C, and the second portable medium insertion processing unit 651 outputs the second user terminal random number TMRND2*a* to the terminal information update unit 654. Further, the second portable medium insertion processing unit 651 writes the value of the second user terminal random number over the first user terminal random number that is recorded in the second portable medium 5*a*, and deletes the second user terminal random number, via the second portable medium access unit 61.

The terminal information update unit 654 receives the second user terminal random number TMRND2*a* from the second portable medium insertion processing unit 651, and writes the value of the second user terminal random number TMRND2*a* over the first user terminal random number stored in the storage unit 64 (Step S606).

Next, the second portable medium insertion processing unit 651 judges, via the second portable medium access unit 61, whether or not a title identifier and encrypted title key corresponding to the user terminal identifier TMIDa are recorded on the second portable medium (Step S607). If judging in the negative (NO in Step 607), the second portable medium insertion processing unit 651 ends the processing. If judging in the affirmative (YES in Step 607), the second portable medium insertion processing unit 651 reads the title identifier and the encrypted title key, transmits the read title identifier and encrypted title key to the encrypted title key decryption unit 653, and deletes the title identifier and encrypted title key that correspond to the user terminal identifier TMIDa from the second portable medium 5*a*.

At this stage, the user terminal table 501 recorded on the second portable medium 5*a* is in the state indicated in FIG. 3D.

The Encrypted Title Key Decoding Unit 653

The encrypted title key decryption unit 653 receives the title identifier and the encrypted title key from the second portable medium insertion processing unit 651, acquires the private key 672 from the storage unit 64, and obtains the title key by decrypting the encrypted title key using the private key 672.

If, for example, the title key is "TLID1", and the encrypted title key is Enc(IKa, TLK1) (i.e., the title key "TLK1" encrypted using the private key "IKa") the encrypted title key decrypting unit 653, receives TLID1 and Enc (IKa, TLK1) from the second portable medium insertion processing unit 651, acquires the private key 672 "IKa" from the storage unit 64, and obtain the title key TLK1 by decrypting the encrypted title key Enc(IKa, TLK1) using on the private key IKa.

The encrypted title key decryption unit 653 adds, as a piece title information, the received title identifier in combination with obtained title key to the title information table 681 stored in the storage unit 64 (Step S608), and ends the processing.

(2) Contents Purchasing Processing

Here, it is assumed that the terminal information of the user terminal 6*a*, including the user terminal identifier TMIDa and the user terminal random number TMRND1*a*, has been recorded on the second portable medium 5*a* by way of the above-described initial setting operations.

The user takes the second portable medium 5*a* to a retail outlet, purchases the first portable medium 4, and inserts the second portable medium 5*a* in the card slot provided in the information collection server 3. The first portable medium has recorded thereon encrypted content ENCCNT1 (i.e., ENC(TLK1, CNT1)) identified by the title identifier TLID1.

Figure 8:
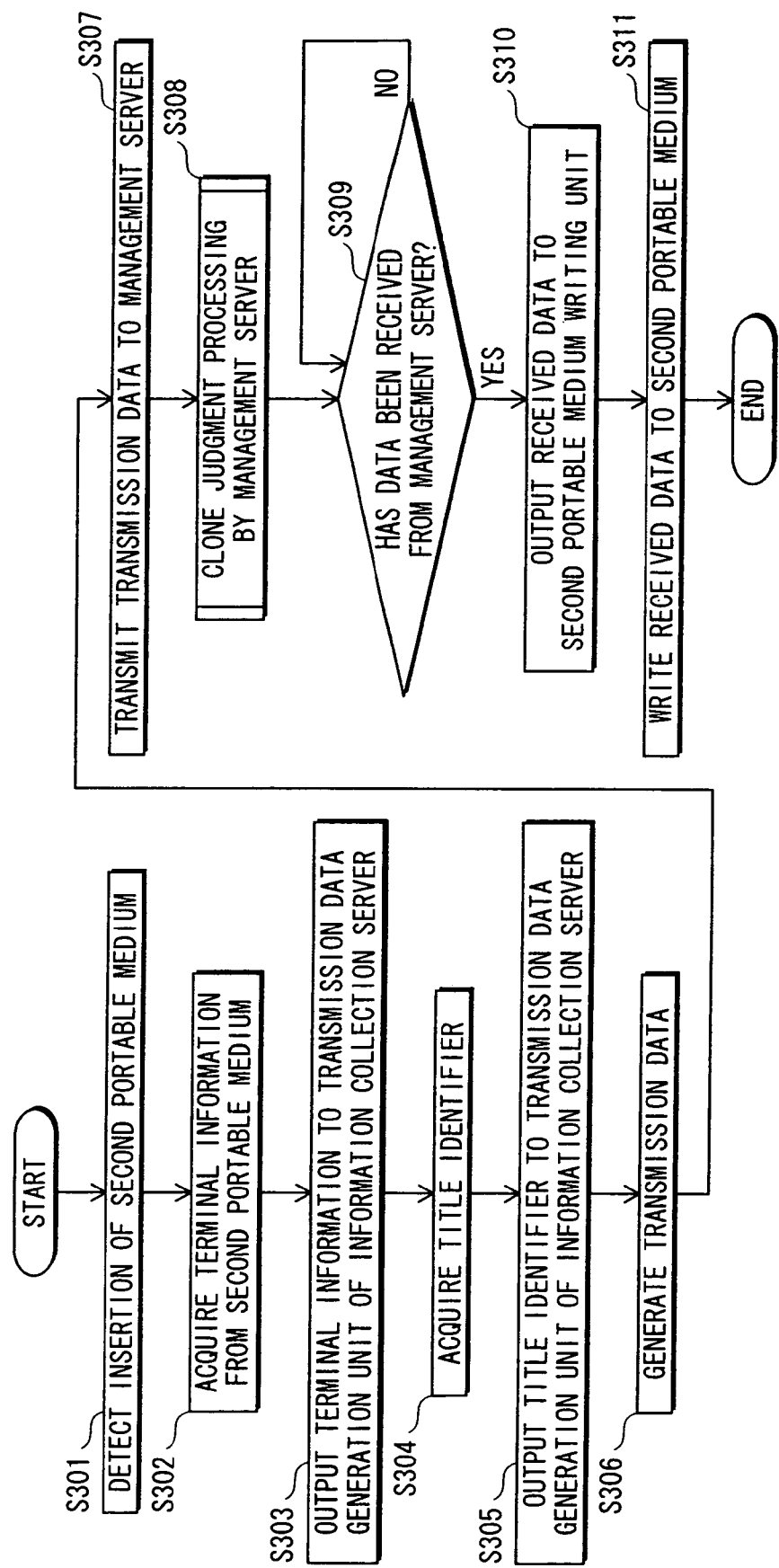
FIG. 8 is a flowchart showing operations of an information collection server of the embodiment of the present invention.
Figure 9:
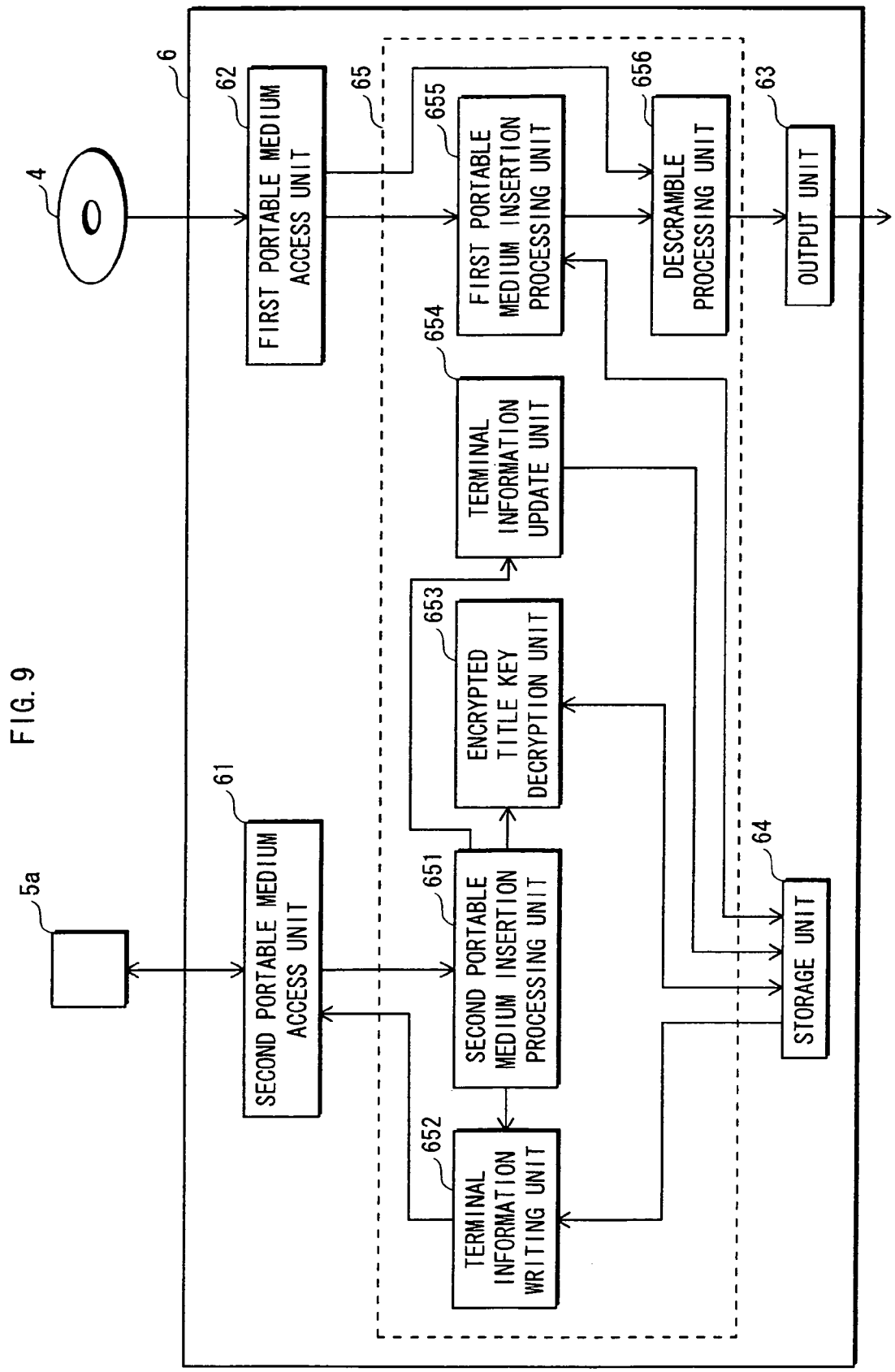
FIG. 9 is a block diagram showing a construction of a user terminal of the embodiment of the present invention.

The following describes the contents purchasing operations with reference to FIG. 8.

In the information server 3, the second portable medium access unit 32 detects insertion of second portable medium 5*a* has into the card slot, and transmits insertion notification to the second portable medium insertion processing unit (Step S301).

The second portable medium insertion processing unit 341, receives the insertion notification, and acquires the user terminal identifier TMIDa and the first user terminal random number TMRND1*a* (Step S302).

The second portable medium insertion processing unit 341 outputs the acquired user terminal identifier TMIDa and the first user terminal random number TMRND1*a* to the transmission data generation unit 343 (Step S303), and outputs a title information request to the title information acquisition unit 342.

The title information acquisition unit 342 receives the title information request from the second portable medium insertion processing unit 341, and transmits to the display 35 an instruction to display a message prompting the user to input the title identifier. The display unit 35 displays the message in accordance with the instruction.

Prompted by the message, the user inputs the title identifier TLID1, which identifies the purchased content, via the external input unit 33.

The title information acquisition unit 342 acquires the title identifier TLID1 from the external input unit 33 (Step S304), and outputs the acquired title identifier to the transmission data generation unit 343 (Step S305).

The transmission data generation unit 343 acquires the user terminal identifier TMIDa and the first user terminal random number TMRND1*a* from the second portable medium insertion processing unit 341, receives the title identifier TLID1 from the title information acquisition unit 342, generates the transmission data including the user terminal identifier TMIDa, the first user terminal random number TMRND1*a*, and the title identifier TLID1, and outputs the transmission data to the transmission processing unit 344 (Step S306).

The transmission processing unit 344 receives the transmission data from the transmission data generation unit, and transmits the received transmission data to the management server 2 via the transmission/reception unit 31 (Step S307).

The management sever 2 receives the transmission data and performs clone judgment processing using the transmission data (Step S308). The clone judgment processing is described in a later section.

The management server 2 transmits terminal update data generated in the clone judgment processing to the information collection server 3.

The terminal update data includes the second user terminal random number TMRND2*a*, the title identifier TLID1, and the encrypted title key ENCTLK1 (i.e, ENC(IKa, TLK1)).

The transmission/reception unit 31 in the information collection server 3 awaits receipt of the terminal update data from the management server 2 (NO in Step S309), and on receipt of the terminal update data (YES in Step S309), transmits the terminal update data to the reception processing unit 345.

The reception processing unit 345 outputs the second user terminal random number TMRND2*a*, the title identifier TLID1, and the encrypted title key ENCTLK1, which are contained in the received terminal update data, to the second portable medium data writing unit 346 (Step S310).

The second portable medium data writing unit 346 receives the second user terminal random number TMRND2a, the title identifier TLID1, and the encrypted title key ENCTLK1, and records the received second user terminal random number TMRND2a, the title identifier TLID1 and the encrypted title key ENCTLK1 on the second portable medium via the second portable medium access unit 32 (Step S311).

Figure 6:
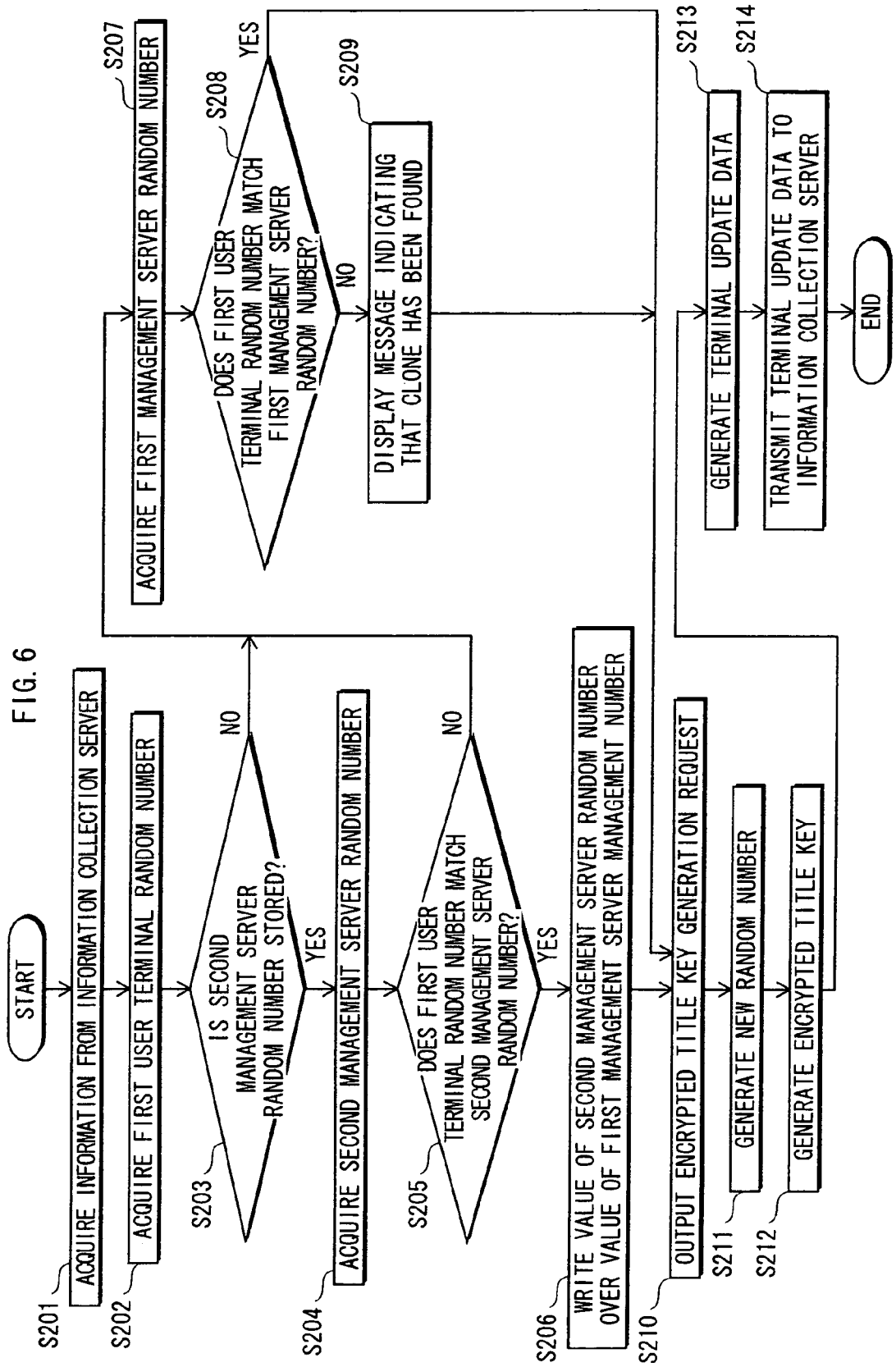
FIG. 6 is a flowchart showing an example of operations of the management server of the present invention.

The clone judgment processing performed by the management server 2 in Step S308 is described below with reference to FIG. 6.

The transmission/reception unit 21 in the management server 2 receives the transmission data from the information collection server 3, and transmits the transmission data to the reception processing unit 241.

The reception processing unit 241, receives the transmission data, outputs the included user terminal identifier TMIDa and the first user terminal random number TMRND1a to the terminal information verifying unit 242, and outputs the user terminal identifier TMIDa and the title identifier TLID1 to the title key encryption unit 244 (Step S201).

The terminal information verifying unit 242 receives the user terminal identifier TMIDa and the first user terminal random number TMRND1a from the reception processing unit 241 (Step S202), judges whether or not a second management server random number is stored in correspondence with the user terminal identifier TMIDa in the storage unit 23 (Step S203). If the second management server random number is not stored (NO in Step S203), the terminal information verifying unit 242, proceeds to Step S207, which is described below. If the second management server random number is stored (YES in Step S203), the terminal information verifying unit acquires the second management server random number CRND2a from the storage unit 23 (Step S204).

The terminal information verifying unit 242 judges whether or not the value TMRND1a of first user terminal random number matches the value CRND2a of the second management server random number (Step S205), and if judging in the negative (NO in Step S205), proceeds to Step S207, which is described below. If judging affirmatively (YES in Step S205), the terminal information verifying unit 242 writes the value CRND2a of the second management server random number over the value CRND1a of the first management server random number that corresponds with the user terminal identifier TMIDa, deletes the second management server random number CRND2a, and proceeds to Step S210 (Step S206).

If judging that the value of the first user terminal random number TMRND1a fails to match the value of the second management server random number CRND2a (NO in Step S205), the terminal information verifying unit 242, acquires the first management server random number CRND1a, which corresponds to the user terminal identifier TMIDa, from the storage unit 23 (Step S207).

The terminal information verifying unit 242 compares the value of the first user terminal random number TMRND1a with the value of the first management server random number CRND1a (Step S208), and if judging that the two match (YES in step S208), proceeds to Step S210. If judging that the two fail to match (NO in Step S208, the terminal information verifying unit 242 indicates that the user terminal corresponding to the user terminal identifier TMIDa is a clone. The information verifying unit 242 then causes the display unit to display a screen containing a message such as "Clone discovered: user terminal identifier TMIDa" (Step S209), and proceeds to Step S210.

The terminal information verifying unit 242 outputs the user terminal identifier TMIDa to the terminal information generation unit 243, and outputs an encrypted title key generation request to the title key encryption unit 244 (Step S210).

The terminal information generation unit 243 acquires the user terminal identifier TMIDa from the terminal information verifying unit 242, generates a new random number, and stores the generated random number in the storage unit 23 in correspondence with the user terminal identifier TMIDa as the value of the second management server random number CRND2a.

The terminal information generation unit 243 also outputs the random number to the transmission data generation unit 245 as the second user terminal random number TMRND2a (Step S211).

The title key encryption unit 244 receives the user terminal identifier TMIDa and the title identifier TLID1 from the reception processing unit 241, receives the encrypted title key generation request from the terminal information verifying unit 242, and acquires from the storage unit 23 the private key IKa that corresponds to the user terminal identifier TMIDa and the title key TLK1 that corresponds to the title identifier TLID1.

The title key encryption unit 244 then encrypts the title key TLK1 using the private key IKa to generate the encrypted title key ENCTLK1=Enc (TLK1, IKa), and outputs the title identifier TLDID1 and the encrypted title key ENCTLK1 to the transmission data generation unit 245 (Step S212).

The transmission data generation unit 245 receives the second user terminal random number TMRND2a from the terminal information generation unit 243, and receives the title identifier TLID1 and the encrypted title key ENCTLK1 from the title key encryption unit 244.

The transmission data generation unit 245 generates terminal update data including the received second user terminal random number TMRND2a, the title identifier TLID1, and the encrypted title key ENCTLK1, and transmits the terminal update data to the transmission processing unit 246 (Step S213).

The transmission processing unit 246 receives the terminal update data from the transmission data generation unit 245, transmits the terminal update data to the information collection server 3 via the transmission/reception unit 21, and ends the processing (Step S214).

(3) Playback Processing

Here, it is assumed that after purchasing the first portable medium 4 in the retail outlet, the user returns home, and, to view the content, inserts the first portable medium 4 and the second portable medium 5a into the user terminal 6a. On insertion of the second portable medium 5a, the user terminal 6a performs the update processing of Steps S605 to S608 in FIG. 11.

Figure 12:
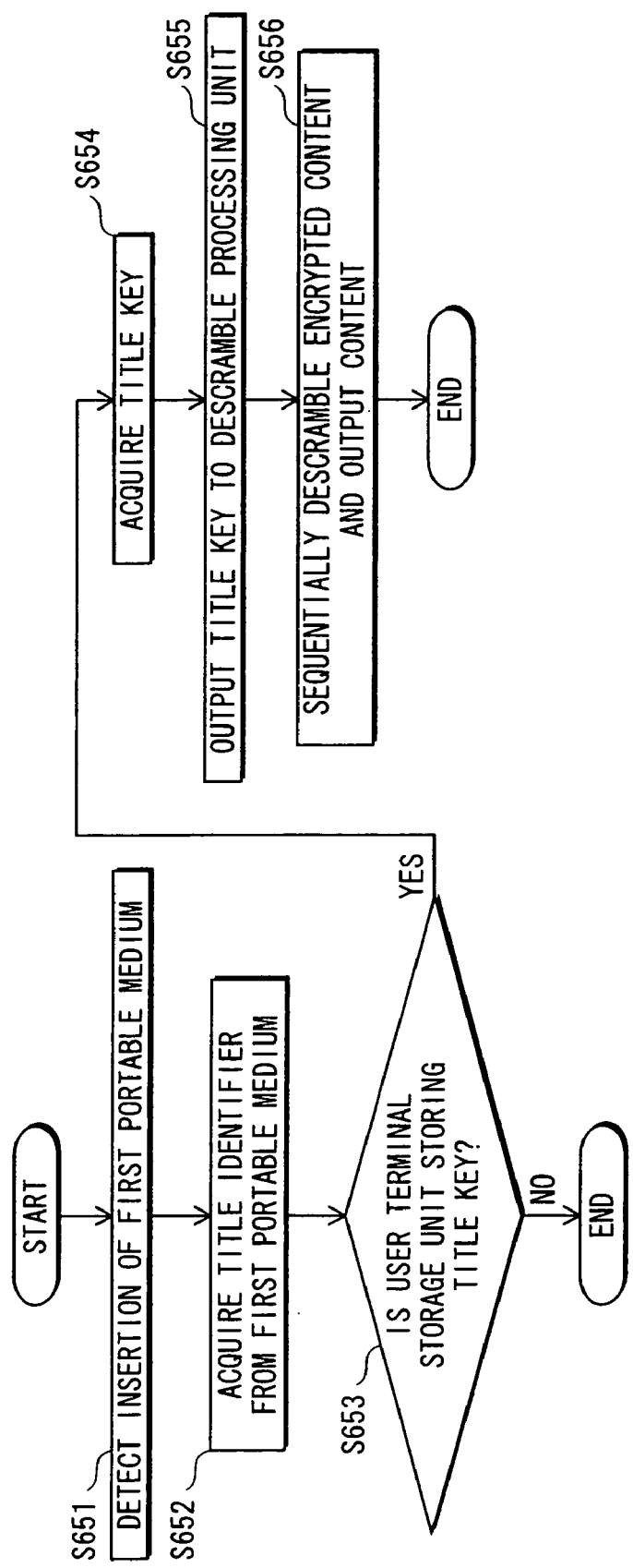
FIG. 12 is a flowchart showing content playback processing in the user terminal of the embodiment of the present invention.

The following describes the content playback processing with reference to FIG. 12.

When the first portable medium 4 is inserted into the disk slot provided in the user terminal 6a, the first portable medium access unit 62 detects the insertion, and transmits insertion notification to the first portable medium insertion processing unit 655. The first portable medium insertion processing unit 655 receives the insertion notification (Step S651).

The first portable medium insertion processing unit 655 acquires the title identifier TLID1, which is recorded on the first portable medium, via the first portable medium access unit 62 (Step S652).

The first portable medium insertion processing unit 655 judges whether or not the title key TLK1 corresponding to the title identifier TLID1 is stored in the storage unit 64 (Step S653), and if judging negatively (NO in Step S653), ends the processing. If judging affirmatively (YES in Step S653), the first portable medium insertion processing unit 655 reads, from the storage unit 64, the title key TLK1 corresponding to the title identifier TLID1, which has been read from the first portable medium 4 (Step S654), and outputs the title key TLK1 to the descramble processing unit 656 (Step S655).

The descramble processing unit 656 receives the title key TLK1 from the first portable medium insertion unit 655, and then sequentially acquires the encrypted content ENCCNT1 from the first recording medium via the first portable medium access unit 62. The descramble processing unit 656 then sequentially descrambles the encrypted content using the title key TLK1, and sequentially outputs the result to an external display via the output unit 63.

When the descrambling of the encrypted content ENCCT1 and the outputting of the content is complete, the descramble processing unit 656 ends the processing (Step S656).

Additional Description of Effects of Embodiment

This additional description of the effects of the present invention concerns the case where one of the user terminals (in this case 6a) has been analyzed and the terminal information, which includes the user terminal identifier TMIDa, the private key IKa, and the first user terminal random number TMRND1a, has been found.

When the terminal information has been found in this way, there is a possibility that a large number of clone terminals (one denoted 6y) will appear on the market.

The user terminal 6a and the clone terminal 6y hold the same terminal information, including the user terminal identifier TMIDa, the private key IKa, and the first user terminal random number TMRND1a.

Here, it is assumed that the user of the user terminal 6a (user a) and the user of the clone terminal (user y) are different users, and that the user a and user y have differing second portable media 5a and 5y.

Firstly, consider the normal scenario in which the user of the user terminal 6a goes to purchase a first portable medium 4 containing content.

In this case, the second portable medium 5a held by the user a is inserted into the information collection server 3 installed at the retail outlet.

The management server 2 then writes the encrypted title key and a new random number to the second portable medium 5a. The new random number is the second user terminal random number for the user terminal having the user terminal identifier TMIDa.

The user a inserts the second portable medium 5a into the user terminal 6a. The value of the first user terminal random number is then updated to the value of the second user terminal random number recorded on the portable medium 5a.

When the user purchases another set of content, the user inserts the second portable medium 5a in the information collection server 3 installed in the retail outlet in the same way as before.

A new random number is then set as the first random number on the second portable medium 5a.

On receipt of the new random number via the information collection server 3, the management server 2 recognizes that the first user terminal random number of the user terminal 6a that corresponds to the user terminal identifier TMIDa has been updated.

Suppose that the user then subsequently goes to the retail output to purchase content.

In this case, the user y inserts the second portable medium 5y into the information server 3 as described above.

At this stage, the second portable medium 5y held by the user y is storing the user terminal identifier TMIDa and the value of the first user terminal random number from the time at which terminal information was found.

Thus, the management server 2 recognizes that some user terminal 6x, which corresponding to the user terminal identifier TMIDa, is holding an old first user terminal random number.

The management server 2 is aware that the first user terminal random number of the user terminal 6a that corresponds to the user terminal identifier TMIDa has been updated to a new random number.

Consequently, the management server 2 judges that at least two user terminals holding the same user terminal identifier TMIDa are in existence.

The management server then displays a warning indicating that one or more clones of the user terminal corresponding to the user terminal identifier TMIDa are in existence.

Thus, the embodiment of the present invention is able to efficiently discover and detect clones of user terminals.

In the case that one of the user terminals (6a for instance) has been analyzed and the terminal information relating to the user terminal 6a (the user terminal identifier TMIDa, the private key IKa, and the first user terminal random number TMRND1a) has been found, it is possible to imagine another form of clone terminal in which the user terminal identifier TMIDa is altered to a fake value (in this case TMIDz) with the aim of avoiding detection. Such a clone terminal is denoted clone terminal 6z.

However, in the embodiment of the present invention the management server 2 provides the title key for the purchased encrypted content as an encrypted title key which has been encrypted using a private key which corresponds to the received user terminal identifier.

Consequently, if the user terminal identifier TMIDz is passed to the management server 2, the clone terminal 6z, which holds the private key IKa, will be unable to decrypt the received encrypted title key.

Consequently, the clone terminal 6z is unable to output the purchased content.

Thus, to replace the found user terminal identifier with a fake value and supply the fake value to the management server 2 is pointless. The embodiment of the present invention therefore effectively prevents illegitimate use of content in the case that the found user identifier is replaced with a fake value.

Modifications

The above-described embodiment is an exemplary implementation of the present invention. However, the present invention is not limited to this embodiment and may take any of a number of forms without departing from the scope of the present invention. The following modifications are also included in the present invention (1) In the embodiment, every time the second portable medium is inserted into the information collection server and the management server 2 acquires information from the information collection server, the management server 2 generates a random number. The random number is then recorded on the second portable medium as the second user terminal random number, and the random number of the user terminal is updated. However, the present invention is not limited to this arrangement. The random number of the user terminal may instead be updated only once in a predetermined period (a month, for example). Alternatively, the random number may only be updated upon receipt of request signal for random number update from an external party. A further possibility is that the random number is updated upon a predetermined number of purchases (ten, for example). These arrangements can be realized by ensuring that when updated of the random number is unnecessary the management server 2 neither generates a new random number nor stores the second user terminal random number on the second portable medium.

In the management server 2, when it is judged that there is no match in Step S205 and, subsequently, that the value of the first user terminal random number $TMRND1a$ matches the value of the first management server random number $CRND1a$ in Step S208, the user terminal in question is determined not to be a clone terminal. This arrangement is made in view of the possibility that some time is required before the random number in the terminal is updated.

To increase the strictness of the criteria for judging clone terminals, a user terminal may be judged to be clone terminal in the case where it is judged that there is no match in Step S205. In this case the processing proceeds directly to Step S209.

(2) In the embodiment, random numbers are used in the terminal information. However, it is acceptable to use a value other than a random number, provided the management server 2 can recognize the value and the value cannot be easily inferred by a third party not in possession of the corresponding user terminal. For instance, the value may be a serial number that starts at 0 and increments by 1 upon each update. Alternatively, information relating to the time at which the management server 2 received the data from the information collection server 3 may be used. Information relating to the time at which the second portable medium is inserted into the information collection server 3 may be used. A count of a number of insertions of the second portable medium into the information collection server 3 may be used. Information relating to a playback history made up of content titles may be used. Alternatively, the information may be hash values deriving from a playback history.

(3) In the embodiment, random numbers are used in the terminal information. However, it is acceptable to use any value that is automatically updated by the user terminal, provided the value cannot be easily inferred by a third party not in possession of the corresponding user terminal. For instance, time information relating to the last insertion of the second portable medium into the user terminal may be used. A count of the number insertions of the second portable medium into the user terminal may be used. When the value is automatically generated in this way, the management server 2 is no longer required to update the terminal information. As a result, it is possible to reduce the load on the management server 2.

(4) The embodiment relates to a case where each user holds a single second portable medium, but the present invention is not limited to such an arrangement. For instance, each user may hold two or more portable media. If each of second portable media holds the same user terminal identifier, the management server will receive the same user terminal identifier via a plurality of second portable media. With this arrangement, the management server 2 may either write a second user terminal random number, which corresponds to the user terminal identifier, to only one of the second portable media, or write a same second user terminal random number to the plurality of second portable media. Of the two options, the former has the disadvantage that the user terminal random number cannot be updated if the user loses the second portable medium storing the second user terminal random number. The latter, in contrast, has the advantage that the user terminal random number can be updated even if the user loses the second portable medium storing the second user terminal random number. To realize the latter, a random number update completion flag may be added to the terminal information recorded on the second portable medium. The random number completion update flag is written to the value of the second user terminal random number recorded on the second portable medium when the updating of the value of the first user terminal random number of has been completed in all the user terminals. The addition of such a flag enables the same random number, which corresponds to a single user terminal identifier, to be written to a plurality of second portable media. Even if the terminal information is provided to the management server 2 via a plurality of second portable media, the management server 2 only recognizes that the random number update is complete if the random number completion flag is recorded.

(5) In the embodiment, the second portable medium is an SD card or the like, but the second portable medium is not limited to being an SD card. An IC card capable of computation may be used instead of the SD card. In this case, the second portable medium may be set up to verify the user terminal using encryption processing or the like before providing the terminal information and title key information. This enables a more secure system to be constructed. The random number update completion flag of modification (4) may be added within the IC card. This prevents an unauthorized user from illicitly altering the random number update completion flag in the second portable medium.

Though described as a DVD-ROM, the first portable medium 4 is not limited to being a DVD-ROM, and may alternatively be a BD, a CD-R or any other similar medium capable of storing content. Moreover, the second portable medium is not limited to being an SD card, but may be any portable medium that permits overwriting of data.

(6) In the embodiment, the management server 2 provides title information in response to the acquisition of the terminal information by way of the second portable medium, but the present invention is not limited to this arrangement. For instance, the management server may simply acquire the terminal information without providing any information. Alternatively, the management server 2 may grant a license that is valid for a fixed period (one month, for instance) to the user terminal in exchange for acquiring the terminal information by way of the second portable medium, and prevent the user terminal from using content if the license is not updated during the fixed period.

(7) In the embodiment, the target of the clone finding system is a user terminal that outputs content, but the present invention is not limited to this. For instance, the target of the clone finding system may be the second portable medium (for instance an SD card). Thus, the target may be a train pass, book of tickets, a train ticket, an IC card, a credit card, a cash card, a debit card, electronic money, an electronic ticket, a electronic passport, an electronic tickets, an input output management card, a driver's license, a social security card, a mobile telephone, a PDA, an STB (Set top box), an electronic book, a computer, an IC tag, computer software, an online game license, or the like. In any case, the targets of clone finding system are each made to store random number, and this enables the clone finding system to be applied to technologies other than the user terminal that outputs content.

(8) In the embodiment, the AES private key encryption method is used, but the present invention is not limited to using this method. For example, a different private key encryption method (such as DES) or a public key encryption method (such as RSA) may be used.

(9) In the embodiment, the management server 2 judges that the user terminal corresponding to a user terminal identifier is a clone upon receipt of two differing first user terminal random numbers, each corresponding to the same user terminal identifier. However, the present invention is not limited to such. For example, the management server 2 may judge that user terminal corresponding to a user terminal identifier is a clone upon receipt of a predetermined threshold count (three for instance) of differing first user terminal random numbers corresponding to the same user terminal identifier. With this arrangement, it is possible to reduce the rate of erroneous detection. Moreover, this arrangement is applicable to systems in which a plurality of user terminals has a common user terminal identifier.

For instance, a plurality of user terminals of the same mode may have a common user terminal identifier. In such a system, the predetermined number is set to be at least the number of user terminals having the same user terminal identifier. With this arrangement, it is possible to detect clones, even in systems in which a plurality of user terminals has a common user terminal identifier.

(10) The management server 2 and the information collection server 3 in the description are each provided with a modem or the like, and communicate using the modem, but the present invention is not limited to such an arrangement. For instance, the transmission/reception unit 21 of the management server 2 and the transmission/reception unit 31 of the information collection server 3 may be LAN adaptors, and the communication channel 7 may be the internet.

(11) In the embodiment, an example is described in which thirteen second portable media 5a to 5m are used, but the number of media is not limited to thirteen. Twelve or fewer portable media may be used. Alternatively, fourteen or more portable media may be used. Although in the example the fourteen user terminals 6a to 6n are used, the number of user terminals is not limited to being fourteen. Fifteen or more user terminals may be used. Alternatively, thirteen or fewer user terminals may be used. Further, more than one information collection server 3 may be used. Similarly, more than one type of title identifier and title key may be used.

When the management server 2 is installed in the retail outlet, a read/write apparatus for accessing SD cards, which are used as the second portable media, may be used rather than the information collection server 3. In this case, the management server 2 may acquire the title identifier by user input rather than the information collection server 3.

(12) In the embodiment, content is sold by the retail outlet, but the present invention is not limited to this arrangement, and may be applied in cases where the content is rented or leased.

(13) The functional blocks of the control unit 24 of the management server 2, the control unit 34 of the information collection server, and the control unit 65 of the each of the user terminals 6a to 6n, may be an integrated circuit using LSI. Each of these functional blocks may be realized as a single chip or be included as part of a single chip.

Though LSI is mentioned, the nomenclature varies with the degree of integration. Other names include IC, system LSI, super LSI, and ultra LSI.

A dedicated circuit or general-purpose processor may be used instead of LSI methods to realize the integrated circuit. A FPGA (Field Programmable Gate Array, which programmable after LSI manufacturing may be used. Alternatively, a reconfigurable processor, which permits post-manufacture alteration to the connections and settings of the cells in the LSI, may be used.

Moreover, if a new technology that is an advanced or derivative form of semiconductor technology should replace LSI as a technology for forming integrated circuits, the functional blocks may be integrated using the new technology.

(14) The present invention may be any of the methods shown above. Alternatively, the present invention may be computer programs that realize these methods using a computer, or digital signals composed of the programs. The present invention may be a computer-readable recording medium having the computer program or digital signals recorded thereon, examples of which included flexible disk, hard disk, CD-ROM, MO, DVD, DVD-ROM, DVD-RAM, BD (Blu-rayDisc), and semiconductor memory etc. Alternatively, the present invention may be the computer programs or digital signals recorded on any of these recording media. The present invention may be the computer programs or digital signals transmitted via a data broadcast or a network the like, typical examples of which include a telecommunications network, a wireless or cable network, and the Internet. The present invention may be a computer system provided with a microprocessor and memory, in which the memory stores the computer program and the microprocessor operates in accordance with the computer programs. The computer programs or digital signals may be executed on a separate independent computer system by transferring the computer program or digital signals recorded on the recording medium, or by transferring the computer programs or digital signals via a network or the like.

(15) The present invention may be any combination of the above embodiments and modifications.

The unauthorized apparatus detection device, content playback device, information collection device, program, recording medium, and integrated circuit of the present invention can be used in management systems for content that requires copyright protection, and can be manufactured and sold by industries that deal with computers and digital electronic devices such as content playback devices and management servers for such playback devices.

The invention claimed is:

1. An unauthorized apparatus detection device connected to an information server capable of having a portable media inserted therein, the portable media further for being inserted into a detection target apparatus, the portable media storing a target apparatus identifier and a corresponding first verification value, and the target apparatus identifier identifying the detection target apparatus, the unauthorized apparatus detection device comprising:

a storage unit that stores the target apparatus identifier and the first verification value, the target apparatus identifier and the first verification value being previously received from the information server by the unauthorized apparatus detection device;

a generation unit that generates a second verification value that differs from the first verification value that corresponds to the target apparatus identifier, and that overwrites, in the storage unit, the second verification value in place of the first verification value;

a transmission/reception unit that transmits to the information server the second verification value, such that the information server writes the second verification value into the portable media when the portable media is inserted into the information server, and such that the detection target apparatus overwrites, in the portable media, the second verification value in place of the first verification value when the portable media is inserted into the detection target apparatus, the transmission/reception unit receiving, from the information server, the target apparatus identifier and the second verification value, as a received verification value, when the portable media, into which the second verification value is overwritten in place of the first verification value by the detection target apparatus, is inserted into the information server;

a control unit (i) that, when the received target apparatus identifier matches the stored target apparatus identifier, judges whether or not the received verification value matches the stored second verification value, and (ii) that, when it is judged that the received verification value does not match the stored second verification value, registers the target apparatus identifier on an unauthorized apparatus list; and a title key storage unit that stores a title key for decrypting encrypted content, wherein, when the control unit judges that the received verification value matches the stored second verification value, the control unit transmits the title key to the information server, such that the information server writes the title key into the portable media, and such that the detection target apparatus decrypts the encrypted content using the title key when the portable media storing the title key is inserted into the detection target apparatus.

2. The unauthorized apparatus detection device of claim 1, wherein, when the control unit judges that the received verification value matches the stored second verification value, the generation unit generates a third verification value that differs from the second verification value, and overwrites, in the storage unit, the third verification value in place of the second verification value, and the transmission/reception unit transmits the third verification value to the information server.

3. The unauthorized apparatus detection device of claim 1, further comprising:

a counting unit that counts a number of affirmative judgments, such that an affirmative judgment indicates that the control unit has judged that the received verification value matches the stored second verification value; and a count judging unit that judges whether a total number of affirmative judgments exceeds a predetermined number, wherein, when the total number exceeds the predetermined number, the generation unit generates a third verification value that differs from the second verification value, and overwrites in the storage unit the third verification value in place of the second verification value.

4. The unauthorized apparatus detection device of claim 1, further comprising:

a period measuring unit that measures a period since a last verification value is transmitted; and a period judging unit that judges whether a total period exceeds a predetermined period, wherein, when the total period exceeds the predetermined period, the generation unit generates a third verification value that differs from the second verification value, and overwrites in the storage unit the third verification value in place of the second verification value.

5. The unauthorized apparatus detection device of claim 1, wherein the generation unit generates a random number to use as each verification value.

6. An unauthorized apparatus detection device connected to an information server capable of having a portable media inserted therein, the portable media storing a target apparatus identifier and a corresponding first verification value, and the target apparatus identifier identifying a target apparatus, the unauthorized apparatus detection device comprising:

a storage unit that stores the target apparatus identifier and the first verification value that corresponds to the target apparatus identifier, the target apparatus identifier and the first verification value being previously received from the information server by the unauthorized apparatus detection device;

a generation unit that generates a second verification value that differs from the first verification value, and overwrites, in the storage unit, the second verification value in place of the first verification value;

a transmission/reception unit that transmits to the information server the second verification value, such that the information server writes the second verification value into the portable media, and such that when the portable media, into which the second verification value is written, is inserted into the target apparatus, the target apparatus overwrites, in the portable media, the second verification value in place of the first verification value, the transmission/reception unit receiving, from the information server, the target apparatus identifier and the second verification value, as a received verification value, when the portable media, into which the second verification value is overwritten in place of the first verification value by the target apparatus, is inserted into the information server; and a control unit (i) that, when the received target apparatus identifier matches the stored target apparatus identifier, judges whether or not the received verification value matches the stored second verification value, and (ii) that, when it is judged that the received verification value does not match the stored second verification value, registers the target apparatus identifier on an unauthorized apparatus list, wherein the target apparatus stores a private key, wherein the unauthorized apparatus detection device further comprises:

a title key storage unit that stores a title key for decrypting encrypted content;

a duplicate key storage unit that stores, in correspondence with the target apparatus identifier, a duplicate key that is a copy of the private key; and an encrypted title key generation unit that encrypts the title key using the duplicate key to generate an encrypted title key, and wherein, when the control unit judges that the received verification value matches the stored second verification value, the control unit transmits to the information server the encrypted title key, such that the information server writes the encrypted title key into the portable media, and the target apparatus decrypts the encrypted title key using the private key when the portable media storing the encrypted title key is inserted into the target apparatus.

7. An unauthorized apparatus detection system including an unauthorized apparatus detection device, an information server, a portable media and a detection target apparatus, the portable media for being inserted into the information server and the detection target apparatus, the portable media storing a target apparatus identifier and a corresponding first verification value, the target apparatus identifier identifying the detection target apparatus, wherein the detection target apparatus comprises:
a first storage unit that stores the target apparatus identifier and the first verification value that corresponds to the target apparatus identifier; and
a first control unit that writes the target apparatus identifier and the first verification value into the portable media when the portable media is inserted into the detection target apparatus, wherein the information server transmits the target apparatus identifier and the first verification value to the unauthorized apparatus detection device when the portable media is inserted into the information server, and wherein the unauthorized apparatus detection device comprises:
a second storage unit that stores the target apparatus identifier and the first verification value that corresponds to the target apparatus identifier;
a generation unit that generates a second verification value that differs from the first verification value, and overwrites, in the second storage unit, the second verification value in place of the first verification value;
a transmission/reception unit that transmits to the information server the second verification value, such that the information server writes the second verification value into the portable media, and such that, when the portable media, into which the second verification value is written, is inserted into the detection target apparatus, the detection target apparatus overwrites in the portable media the second verification value in place of the first verification value, the transmission/reception unit receiving, from the information server, the target apparatus identifier and the second verification value, as a received verification value, when the portable media, into which the second verification value is overwritten in place of the first verification value by the detection target apparatus, is inserted into the information server;
a second control unit (i) that, when the received target apparatus identifier matches the stored target apparatus identifier, judges whether or not the received verification value matches the stored second verification value, and (ii) that, when it is judged that the received verification value does not match the stored second verification value, registers the target apparatus identifier on an unauthorized apparatus list; and
a title key storage unit that stores a title key for decrypting encrypted content,
wherein, when the second control unit judges that the received verification value matches the stored second verification value, the second control unit transmits the title key to the information server, such that the information server writes the title key into the portable media, and the detection target apparatus decrypts the encrypted content using the title key when the portable media storing the title key is inserted into the detection target apparatus.

8. The unauthorized apparatus detection system of claim 7, wherein the information server includes:
a reading unit that reads, from the portable media, the target apparatus identifier and the corresponding verification value; and
a transmission unit that transmits the target apparatus identifier and the corresponding verification value to the unauthorized apparatus detection device.

9. An unauthorized apparatus detection method of using an unauthorized apparatus detection device, the unauthorized apparatus detection device detecting an unauthorized apparatus produced by copying, the unauthorized apparatus detection device being connected to an information server capable of having a portable media inserted therein, the portable media further for being inserted into a detection target apparatus, the portable media storing a target apparatus identifier and a corresponding first verification value, and the target apparatus identifier identifying the detection target apparatus, the detection method comprising:
storing the target apparatus identifier and the first verification value that corresponds to the target apparatus identifier, the target apparatus identifier and the first verification value being previously received from the information server by the unauthorized apparatus detection device;
generating a second verification value that differs from the first verification value, and overwriting, in the storage unit, the second verification value in place of the first verification value;
transmitting to the information server the second verification value, such that the information server writes the second verification value into the portable media when the portable media is inserted into the information server, and such that the detection target apparatus overwrites, in the portable media, the second verification value in place of the first verification value when the portable media is inserted into the detection target apparatus;
receiving, from the information server, the target apparatus identifier and the second verification value, as a received verification value, when the portable media, into which the second verification value is overwritten in place of the first verification value by the detection target apparatus, is inserted into the information server;
judging, when the received target apparatus identifier matches the stored target apparatus identifier, whether or not the received verification value matches the stored second verification value;
registering, when the judging judges that the received verification value does not match the stored second verification value, the target apparatus identifier on an unauthorized apparatus list;
storing a title key for decrypting encrypted content; and
transmitting, when the judging judges that the received verification value matches the stored second verification value, the title key to the information server, such that the information server writes the title key into the portable media, and such that the detection target apparatus decrypts the encrypted content using the title key when the portable media storing the title key is inserted into the detection target apparatus.

10. A computer-readable recording medium having a computer program recorded thereon, the computer program to be used by an unauthorized apparatus detection device, the unauthorized apparatus detection device detecting an unauthorized apparatus produced by copying, the unauthorized apparatus detection device being connected to an information server capable of having a portable media inserted therein, the portable media further for being inserted into a detection target apparatus, the portable media storing a target apparatus identifier and a corresponding first verification value, and the target apparatus identifier identifying the detection target apparatus, the detection method comprising:
storing the target apparatus identifier and the first verification value that corresponds to the target apparatus identifier, the target apparatus identifier and the first verification value being previously received from the information server by the unauthorized apparatus detection device;

generating a second verification value that differs from the first verification value, and overwriting, in the storage unit, the second verification value in place of the first verification value;

transmitting to the information server the second verification value, such that the information server writes the second verification value into the portable media when the portable media is inserted into the information server, and such that the detection target apparatus overwrites, in the portable media, the second verification value in place of the first verification value when the portable media is inserted into the detection target apparatus;

receiving, from the information server, the target apparatus identifier and the second verification value, as a received verification value, when the portable media, into which the second verification value is overwritten in place of the first verification value by the detection target apparatus, is inserted into the information server;

judging, when the received target apparatus identifier matches the stored target apparatus identifier, whether or not the received verification value matches the stored second verification value;

registering, when the judging judges that the received verification value does not match the stored second verification value, the target apparatus identifier on an unauthorized apparatus list;

storing a title key for decrypting encrypted content; and transmitting, when the judging judges that the received verification value matches the stored second verification value, the title key to the information server, such that the information server writes the title key into the portable media, and such that the detection target apparatus decrypts the encrypted content using the title key when the portable media storing the title key is inserted into the detection target apparatus.

11. An integrated circuit used in an unauthorized apparatus detection device, the unauthorized apparatus detection device being connected to an information server capable of having a portable media inserted therein, the portable media further for being inserted into a detection target apparatus, the portable media storing a target apparatus identifier and a corresponding first verification value, and the target apparatus identifier identifying the detection target apparatus, the integrated circuit comprising:

a storage unit that stores the target apparatus identifier and the first verification value, the target apparatus identifier and the first verification value being previously received from the information server by the unauthorized apparatus detection device;

a generation unit that generates a second verification value that differs from the first verification value that corresponds to the target apparatus identifier, and that overwrites, in the storage unit, the second verification value in place of the first verification value;

a transmission/reception unit that transmits to the information server the second verification value, such that the information server writes the second verification value into the portable media when the portable media is inserted into the information server, and such that the detection target apparatus overwrites, in the portable media, the second verification value in place of the first verification value when the portable media is inserted into the detection target apparatus, the transmission/reception unit receiving, from the information server, the target apparatus identifier and the second verification value, as a received verification value, when the portable media, into which the second verification value is overwritten in place of the first verification value by the detection target apparatus, is inserted into the information server;

a control unit (i) that, when the received target apparatus identifier matches the stored target apparatus identifier, judges whether or not the received verification value matches the stored second verification value, and (ii) that, when it is judged that the received verification value does not match the stored second verification value, registers the target apparatus identifier on an unauthorized apparatus list; and a title key storage unit that stores a title key for decrypting encrypted content, wherein, when the control unit judges that the received verification value matches the stored second verification value, the control unit transmits the title key to the information server, such that the information server writes the title key into the portable media, and such that the detection target apparatus decrypts the encrypted content using the title key when the portable media storing the title key is inserted into the detection target apparatus.

* * * * *